United States Patent
Meyer et al.

(10) Patent No.: US 12,255,860 B2
(45) Date of Patent: *Mar. 18, 2025

(54) INTEGRATED THIRD-PARTY APPLICATION BUILDER TRIGGER FOR MESSAGE FLOW

(71) Applicant: Stodge Inc., Scottsdale, AZ (US)

(72) Inventors: Alexander Colin Meyer, Chicago, IL (US); Gerardo Díaz de la Serna Formoso, Mexico City (MX); Gideon Daniel VanRiette, Chicago, IL (US); James Quinlan, Richmond, VA (US); Joy Taylor Kaufman, Durham, NC (US); Kameron Ahler, Colorado, CA (US); Lauren Leia Rouse, Nashville, TN (US); Vishak Swaminathan Visvanathan, Brooklyn, NY (US)

(73) Assignee: Stodge Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,639

(22) Filed: Oct. 12, 2023

(65) Prior Publication Data

US 2024/0129265 A1   Apr. 18, 2024

Related U.S. Application Data

(60) Provisional application No. 63/415,600, filed on Oct. 12, 2022.

(51) Int. Cl.
*G06F 15/173* (2006.01)
*H04L 51/214* (2022.01)
(Continued)

(52) U.S. Cl.
CPC .......... *H04L 51/214* (2022.05); *H04L 51/234* (2022.05); *H04L 51/48* (2022.05)

(58) Field of Classification Search
CPC ...... H04L 51/214; H04L 51/234; H04L 51/48
See application file for complete search history.

(56) References Cited

U.S. PATENT DOCUMENTS

| 7,050,989 B1 | 5/2006 | Hurt et al. |
| 7,379,920 B2 | 5/2008 | Leung et al. |

(Continued)

FOREIGN PATENT DOCUMENTS

| CN | 113014508 A | 6/2021 |
| EP | 2744158 A1 | 6/2014 |

(Continued)

OTHER PUBLICATIONS

Agarwal, A. "Click-to-Message Ads Bring a New and Easy Way to Talk to Customers." Google Ads, Oct. 18, 2016, 2 pages, [Online] [Retrieved Feb. 22, 2023], Retrieved from the Internet <URL:https://blog.google/products/ads/click-to-message-ads-bring-new-and-easy/>.

(Continued)

*Primary Examiner* — Imad Hussain
(74) *Attorney, Agent, or Firm* — Fenwick & West LLP

(57) ABSTRACT

A message management platform may receive, from an application operator, a configuration of a message flow. The message flow includes one or more messages associated with trigger conditions. The platform may receive, from a code snippet incorporated in an application of a user computing device, a notification that the user computing device has used the application. The platform may associate a user identifier with the user computing device. The platform may subscribe to, on behalf of the application operator, one or more API notification channels of the application builder platform. The platform may receive an API notification from the application builder platform. The platform may determine that the application builder platform's user is associated with the user identifier used by the message manage- (Continued)

ment platform. The platform may determine that the event described in the payload matches the trigger condition and transmit the first message to the user computing device.

30 Claims, 17 Drawing Sheets

(51) Int. Cl.
  *H04L 51/234* (2022.01)
  *H04L 51/48* (2022.01)

(56) References Cited

U.S. PATENT DOCUMENTS

| | | |
|---|---|---|
| 7,444,658 B1 | 10/2008 | Matz et al. |
| 7,606,560 B2 | 10/2009 | Labrou et al. |
| 7,669,177 B2 | 2/2010 | Gerber et al. |
| 7,957,532 B2 | 6/2011 | Chen et al. |
| 7,979,316 B2 | 7/2011 | Coelho et al. |
| 8,255,288 B1 | 8/2012 | Gupta et al. |
| 8,438,245 B2 | 5/2013 | Chor |
| 8,447,700 B2 | 5/2013 | Yuen et al. |
| 8,467,817 B2 | 6/2013 | Said et al. |
| 8,494,077 B2 | 7/2013 | Haustein et al. |
| 8,532,283 B1 | 9/2013 | Haggerty et al. |
| 8,543,577 B1 | 9/2013 | Ben-Artzi et al. |
| 8,577,804 B1 | 11/2013 | Bacastow |
| 8,606,234 B2 | 12/2013 | Pei et al. |
| 8,644,808 B2 | 2/2014 | Gupta et al. |
| 8,774,391 B1 | 7/2014 | Haggerty et al. |
| 8,959,190 B2 | 2/2015 | Kiley et al. |
| 9,251,268 B2 | 2/2016 | Schechter et al. |
| 9,251,520 B2 | 2/2016 | Shen et al. |
| 9,351,193 B2 | 5/2016 | Raleigh et al. |
| 9,355,186 B2 | 5/2016 | Khanna et al. |
| 9,436,961 B2 | 9/2016 | Rashwan |
| 9,485,177 B2 | 11/2016 | Tung et al. |
| 9,569,761 B2 | 2/2017 | Steif et al. |
| 9,594,477 B1 | 3/2017 | Ardakani et al. |
| 9,602,661 B2 | 3/2017 | Rauenbuehler et al. |
| 9,621,735 B2 | 4/2017 | Ting et al. |
| 9,633,378 B1 | 4/2017 | Nath et al. |
| 9,635,057 B2 | 4/2017 | Bone et al. |
| 9,654,581 B2 | 5/2017 | Pollack et al. |
| 9,754,274 B1 | 9/2017 | Brussin et al. |
| 9,762,529 B1 | 9/2017 | Rosenshine |
| 9,767,520 B2 | 9/2017 | Isaacson et al. |
| 9,785,970 B2 | 10/2017 | Gupta et al. |
| 9,806,942 B2 | 10/2017 | Saxena et al. |
| 9,811,395 B1 | 11/2017 | Greenwood et al. |
| 9,847,973 B1 | 12/2017 | Jakobsson et al. |
| 9,898,627 B2 | 2/2018 | Kniaz et al. |
| 9,911,290 B1 | 3/2018 | Zalewski et al. |
| 9,959,547 B2 | 5/2018 | Lewis et al. |
| 9,959,551 B1 | 5/2018 | Schermerhorn et al. |
| 10,015,565 B2 | 7/2018 | Narasipuram |
| 10,042,946 B2 | 8/2018 | Boudville |
| 10,055,211 B2 | 8/2018 | Maddern et al. |
| 10,108,735 B2 | 10/2018 | Dingwall et al. |
| 10,121,186 B2 | 11/2018 | Isaacson et al. |
| 10,180,833 B2 | 1/2019 | Sogani et al. |
| 10,200,486 B2 | 2/2019 | Herrick et al. |
| 10,204,358 B2 | 2/2019 | Friborg |
| 10,275,421 B1 | 4/2019 | Clark et al. |
| 10,319,011 B2 | 6/2019 | Manley et al. |
| 10,402,869 B2 | 9/2019 | Agrawal et al. |
| 10,410,237 B1* | 9/2019 | Barnes ............... G06Q 30/0241 |
| 10,452,247 B2 | 10/2019 | Stephens et al. |
| 10,521,496 B1 | 12/2019 | Goodwin et al. |
| 10,542,069 B2 | 1/2020 | Loeb et al. |
| 10,659,400 B2 | 5/2020 | Moon et al. |
| 10,666,750 B2 | 5/2020 | Nanavati et al. |
| 10,680,841 B1 | 6/2020 | Kalluri et al. |
| 10,691,409 B2 | 6/2020 | Maltsev et al. |
| 10,713,698 B2 | 7/2020 | Peter et al. |
| 10,757,552 B2 | 8/2020 | Gross et al. |
| 10,789,626 B2 | 9/2020 | Nath et al. |
| 10,810,592 B1 | 10/2020 | Omojola et al. |
| 10,817,914 B1 | 10/2020 | Nath et al. |
| 10,868,711 B2 | 12/2020 | Chor |
| 10,942,913 B1 | 3/2021 | Khoyilar et al. |
| 10,979,371 B2 | 4/2021 | Rosenberg et al. |
| 11,023,917 B2 | 6/2021 | Rego et al. |
| 11,050,699 B2 | 6/2021 | Orr et al. |
| 11,055,744 B2 | 7/2021 | Conrad et al. |
| 11,134,131 B1 | 9/2021 | Herrick et al. |
| 11,144,275 B1 | 10/2021 | Hinckley et al. |
| 11,151,603 B2 | 10/2021 | Tasharofi et al. |
| 11,170,380 B1 | 11/2021 | Long et al. |
| 11,194,552 B1 | 12/2021 | Echeverria et al. |
| 11,211,156 B2 | 12/2021 | Iyer et al. |
| 11,227,319 B1 | 1/2022 | Manley |
| 11,336,703 B1 | 5/2022 | Meersma et al. |
| 11,416,887 B1 | 8/2022 | Long et al. |
| 11,416,897 B1 | 8/2022 | Long et al. |
| 11,430,001 B2 | 8/2022 | Yuvaraj |
| 11,553,074 B1 | 1/2023 | Long et al. |
| 2002/0060246 A1 | 5/2002 | Gobburu et al. |
| 2002/0120507 A1 | 8/2002 | Chanos et al. |
| 2002/0152210 A1 | 10/2002 | Johnson et al. |
| 2003/0182207 A1 | 9/2003 | Skinner |
| 2004/0024682 A1 | 2/2004 | Popovitch |
| 2004/0153374 A1 | 8/2004 | Nelson |
| 2004/0215526 A1 | 10/2004 | Luo et al. |
| 2005/0021982 A1 | 1/2005 | Popp et al. |
| 2005/0187873 A1 | 8/2005 | Labrou et al. |
| 2006/0015435 A1 | 1/2006 | Nathanson |
| 2006/0206709 A1 | 9/2006 | Labrou et al. |
| 2006/0224693 A1 | 10/2006 | Gaidemak et al. |
| 2007/0005717 A1 | 1/2007 | Vasseur et al. |
| 2007/0094688 A1 | 4/2007 | Briscoe |
| 2008/0046362 A1 | 2/2008 | Easterly |
| 2008/0059571 A1 | 3/2008 | Khoo |
| 2008/0126515 A1 | 5/2008 | Chambers et al. |
| 2008/0270251 A1 | 10/2008 | Coelho et al. |
| 2008/0307517 A1 | 12/2008 | Grigoriev et al. |
| 2009/0063207 A1 | 3/2009 | Brodzeller |
| 2009/0083154 A1 | 3/2009 | Silk et al. |
| 2009/0128335 A1 | 5/2009 | Leung |
| 2009/0167553 A1 | 7/2009 | Hong et al. |
| 2009/0199107 A1 | 8/2009 | Lewis et al. |
| 2009/0199114 A1 | 8/2009 | Lewis et al. |
| 2009/0247140 A1 | 10/2009 | Gupta et al. |
| 2009/0248543 A1 | 10/2009 | Nihalani et al. |
| 2009/0254824 A1 | 10/2009 | Singh |
| 2009/0287921 A1 | 11/2009 | Zhu et al. |
| 2010/0082440 A1 | 4/2010 | Vaidyanathan et al. |
| 2010/0094759 A1 | 4/2010 | Kanno et al. |
| 2010/0099441 A1 | 4/2010 | Agarwal et al. |
| 2010/0100415 A1 | 4/2010 | Plummer et al. |
| 2010/0114717 A1 | 5/2010 | Lebeau et al. |
| 2010/0262487 A1* | 10/2010 | Edwards ............... G06Q 30/02 <br> 705/14.43 |
| 2010/0274646 A1 | 10/2010 | Townsend et al. |
| 2010/0312587 A1 | 12/2010 | Benson et al. |
| 2010/0312623 A1* | 12/2010 | Almodovar ............ G06Q 30/02 <br> 705/14.4 |
| 2010/0325540 A1 | 12/2010 | Biazetti et al. |
| 2011/0035280 A1* | 2/2011 | Fordyce, III ......... G06Q 20/384 <br> 707/602 |
| 2011/0065420 A1 | 3/2011 | Reyes |
| 2011/0087547 A1 | 4/2011 | Amaro et al. |
| 2011/0140834 A1 | 6/2011 | Kiliccote |
| 2011/0185406 A1 | 7/2011 | Hirson et al. |
| 2011/0202408 A1 | 8/2011 | Kalliola |
| 2011/0302316 A1 | 12/2011 | Chou et al. |
| 2011/0320550 A1 | 12/2011 | Lawson et al. |
| 2012/0054596 A1 | 3/2012 | Kroger et al. |
| 2012/0144281 A1 | 6/2012 | Schechter et al. |
| 2012/0203859 A1 | 8/2012 | Krzyzanowski |
| 2012/0253896 A1 | 10/2012 | Killoran et al. |
| 2012/0253897 A1 | 10/2012 | Killoran et al. |
| 2012/0265641 A1 | 10/2012 | Tannenbaum |
| 2013/0046654 A1 | 2/2013 | Killoran |

(56) References Cited

U.S. PATENT DOCUMENTS

| | | | |
|---|---|---|---|
| 2013/0185750 A1* | 7/2013 | Ayoub | H04N 21/4882 725/34 |
| 2013/0212177 A1 | 8/2013 | Friedman | |
| 2013/0275879 A1 | 10/2013 | Dharmaji et al. | |
| 2013/0275890 A1 | 10/2013 | Caron et al. | |
| 2013/0311285 A1 | 11/2013 | Abrol et al. | |
| 2013/0346122 A1 | 12/2013 | Gibson et al. | |
| 2014/0006129 A1 | 1/2014 | Heath | |
| 2014/0012686 A1 | 1/2014 | Arbon et al. | |
| 2014/0025487 A1 | 1/2014 | Killoran | |
| 2014/0025522 A1 | 1/2014 | Killoran | |
| 2014/0032398 A1 | 1/2014 | Killoran | |
| 2014/0032707 A1 | 1/2014 | Doshi | |
| 2014/0074623 A1 | 3/2014 | Mohammadi et al. | |
| 2014/0108373 A1 | 4/2014 | Abrahami et al. | |
| 2014/0172504 A1 | 6/2014 | Duva et al. | |
| 2014/0188734 A1 | 7/2014 | Neuwirth | |
| 2014/0207611 A1 | 7/2014 | Cleary et al. | |
| 2014/0223005 A1 | 8/2014 | Everly et al. | |
| 2014/0258055 A1 | 9/2014 | Wolfe et al. | |
| 2014/0297784 A1 | 10/2014 | Zhao | |
| 2014/0344061 A1 | 11/2014 | Choi et al. | |
| 2014/0348309 A1 | 11/2014 | Davis et al. | |
| 2015/0049157 A1 | 2/2015 | Krishnamoorthy et al. | |
| 2015/0049160 A1 | 2/2015 | Krishnamoorthy et al. | |
| 2015/0049164 A1 | 2/2015 | Krishnamoorthy et al. | |
| 2015/0052061 A1 | 2/2015 | Anderson et al. | |
| 2015/0081466 A1 | 3/2015 | Sakurai | |
| 2015/0100459 A1 | 4/2015 | Linden et al. | |
| 2015/0100468 A1 | 4/2015 | Blackhurst et al. | |
| 2015/0106181 A1 | 4/2015 | Kluth | |
| 2015/0112767 A1* | 4/2015 | Shatzkamer | G06Q 30/0205 705/7.34 |
| 2015/0112990 A1 | 4/2015 | van Os et al. | |
| 2015/0127392 A1 | 5/2015 | Shivakumar et al. | |
| 2015/0142568 A1 | 5/2015 | Hsu | |
| 2015/0156061 A1 | 6/2015 | Saxena et al. | |
| 2015/0178784 A1 | 6/2015 | Oliver et al. | |
| 2015/0178819 A1 | 6/2015 | Kassemi et al. | |
| 2015/0193537 A1 | 7/2015 | Cierniak | |
| 2015/0212984 A1 | 7/2015 | Bowden | |
| 2015/0220943 A1 | 8/2015 | Dossick et al. | |
| 2015/0229592 A1 | 8/2015 | Rathod | |
| 2015/0281157 A1 | 10/2015 | Pearce et al. | |
| 2015/0294358 A1 | 10/2015 | Galadari et al. | |
| 2015/0350068 A1 | 12/2015 | Tung et al. | |
| 2016/0007198 A1 | 1/2016 | Lacey et al. | |
| 2016/0012465 A1 | 1/2016 | Sharp | |
| 2016/0036752 A1 | 2/2016 | Davis et al. | |
| 2016/0057154 A1 | 2/2016 | Ferguson et al. | |
| 2016/0066273 A1 | 3/2016 | Prats | |
| 2016/0071074 A1* | 3/2016 | Baird | G06Q 20/3265 705/40 |
| 2016/0092902 A1* | 3/2016 | Storry | G06Q 30/0633 705/14.26 |
| 2016/0092919 A1 | 3/2016 | Coleman, Jr. et al. | |
| 2016/0150021 A1 | 5/2016 | Britt et al. | |
| 2016/0210334 A1 | 7/2016 | Prophete et al. | |
| 2016/0234330 A1 | 8/2016 | Popowitz et al. | |
| 2016/0239284 A1 | 8/2016 | Boudville | |
| 2016/0292728 A1 | 10/2016 | Kang et al. | |
| 2017/0004209 A1 | 1/2017 | Johl et al. | |
| 2017/0041742 A1 | 2/2017 | Toksvig et al. | |
| 2017/0046180 A1 | 2/2017 | Desineni et al. | |
| 2017/0083941 A1 | 3/2017 | Biswas et al. | |
| 2017/0099228 A1 | 4/2017 | Hunsperger et al. | |
| 2017/0103435 A1 | 4/2017 | Saia et al. | |
| 2017/0142191 A1 | 5/2017 | Caldwell | |
| 2017/0142214 A1 | 5/2017 | Nanavati et al. | |
| 2017/0188213 A1 | 6/2017 | Nirantar et al. | |
| 2017/0193559 A1 | 7/2017 | Alicherry | |
| 2017/0193851 A1 | 7/2017 | McNichol et al. | |
| 2017/0213242 A1 | 7/2017 | Sundaram et al. | |
| 2017/0222940 A1 | 8/2017 | O'Kelley et al. | |
| 2017/0228797 A1 | 8/2017 | Nath et al. | |
| 2017/0236196 A1 | 8/2017 | Isaacson et al. | |
| 2017/0279759 A1 | 9/2017 | Liden et al. | |
| 2017/0282736 A1 | 10/2017 | Goei | |
| 2017/0295119 A1 | 10/2017 | Rosenberg et al. | |
| 2017/0337609 A1 | 11/2017 | Turemen et al. | |
| 2018/0052943 A1 | 2/2018 | Hui et al. | |
| 2018/0053183 A1 | 2/2018 | Kuncl et al. | |
| 2018/0074999 A1 | 3/2018 | Cogan | |
| 2018/0084111 A1 | 3/2018 | Pirat et al. | |
| 2018/0102947 A1 | 4/2018 | Bhaya et al. | |
| 2018/0219830 A1 | 8/2018 | O'Brien et al. | |
| 2018/0255159 A1 | 9/2018 | Cohen et al. | |
| 2018/0324265 A1 | 11/2018 | Macskassy et al. | |
| 2019/0332365 A1 | 10/2019 | Naganuma et al. | |
| 2020/0111494 A1 | 4/2020 | Lau et al. | |
| 2020/0117823 A1 | 4/2020 | Ojha et al. | |
| 2020/0118161 A1 | 4/2020 | Samuel et al. | |
| 2020/0135005 A1 | 4/2020 | Katz et al. | |
| 2020/0191896 A1 | 6/2020 | Valencia et al. | |
| 2020/0192728 A1 | 6/2020 | Miranda et al. | |
| 2020/0380513 A1 | 12/2020 | Phillips et al. | |
| 2020/0387411 A1 | 12/2020 | Chu et al. | |
| 2020/0404062 A1 | 12/2020 | Wang et al. | |
| 2020/0404390 A1 | 12/2020 | Lieberman et al. | |
| 2021/0044549 A1 | 2/2021 | Renjith et al. | |
| 2021/0044555 A1 | 2/2021 | Orr et al. | |
| 2021/0064362 A1 | 3/2021 | Holt | |
| 2021/0073059 A1 | 3/2021 | Swildens et al. | |
| 2021/0117251 A1 | 4/2021 | Cristofi et al. | |
| 2021/0142364 A1 | 5/2021 | Umeh et al. | |
| 2021/0233097 A1 | 7/2021 | Doumar et al. | |
| 2021/0241315 A1* | 8/2021 | Clark | G06Q 30/0255 |
| 2021/0326932 A1 | 10/2021 | Chu | |
| 2021/0377309 A1 | 12/2021 | Jogand-Coulomb et al. | |
| 2022/0198431 A1 | 6/2022 | Foster et al. | |
| 2022/0292465 A1 | 9/2022 | Schnitt et al. | |

FOREIGN PATENT DOCUMENTS

| | | |
|---|---|---|
| KR | 101545285 B1 | 8/2015 |
| KR | 20210144857 A | 11/2021 |
| WO | WO 2005/062596 A1 | 7/2005 |
| WO | WO 2009/114634 A1 | 9/2009 |
| WO | WO 2013/166787 A1 | 11/2013 |
| WO | WO 2015/103698 A1 | 7/2015 |
| WO | WO 2017/062847 A1 | 4/2017 |
| WO | WO 2019/108753 A1 | 6/2019 |

OTHER PUBLICATIONS

Aggarwal, K. K. et al. "International Journal of Research in Commerce, IT & Management." vol. 3, No. 9, Sep. 2013, pp. 1-136.

Alin-Christian, J. "Disadvantages Present by HTML Inline Frames in Integration of $3^{rd}$ Party Content." CORE, Research Papers in Economics, Jan. 2011, pp. 1-5.

Attentive. "[Alpha] Create a Contextual Campaign." Attentive Help Center, Apr. 2022, 3 pages, [Online] [Retrieved Aug. 29, 2022], Retrieved from the Internet <URL:https://attentive.zendesk.com/hc/en-us/articles/5723283648532--Alpha-Create-a-contextual-campaign>.

Attentive. "Attentive Personalized Text Messaging." YouTube.com, Timestamp: 0:42 / 1:21, Apr. 16, 2021, 1 page, [Online] [Retrieved Feb. 22, 2023], Retrieved from the Internet <URL:https://www.youtube.com/watch?v=ij82qotLJdM&t=42s>.

Attentive. "Concierge in Journeys." Attentive Concierge, Dec. 7, 2022, 3 pages, [Online] [Retrieved Apr. 13, 2023], Retrieved from the Internet <URL:https://help.attentivemobile.com/hc/en-us/articles/4405362579604-Concierge-in-journeys#h_01GFKC9T0V0A80Q0TE5F1VWNXY>.

Attentive. "Discover a New Marketing Channel Built for Retail & E-Commerce." Attentive Presentation, Nov. 2022, slides 1-61.

Attentive. "FAQs: Concierge in Journeys." Attentive Concierge, Nov. 2022, 3 pages, [Online] [Retrieved Apr. 13, 2023], Retrieved from the Internet <URL:https://help.attentivemobile.com/hc/en-us/articles/10231495496980-FAQs-Concierge-in-journeys>.

(56) References Cited

OTHER PUBLICATIONS

Attentive. "How CB2 Doubled its Holiday Season Revenue Year-Over-Year—Driving $2 Million+ with Text Messaging." Attentive Case Study: Home & Hobbies, Sep. 2, 2020, 3 pages, [Online] [Retrieved Apr. 13, 2023], Retrieved from the Internet <URL:https://www.attentive.com/case-studies/cb2-holiday-season-revenue>.

Attentive. "Integrations: Seamlessly Connect to Shopify, Salesforce, and All the Tools you Love." Attentive.com, Aug. 12, 2022, 2 pages, [Online] [Retrieved Feb. 21, 2023], Retrieved from the Internet Archive <URL:https://web.archive.org/web/20220812002048/https://www.attentive.com/integrations>.

Attentive. "Overview: The Text Message Marketing Solution Built to Drive 20.5% of Online Revenue." Attentive.com, Aug. 12, 2022, 5 pages, [Online] [Retrieved Feb. 21, 2023], Retrieved from the Internet Archive <URL:https://web.archive.org/web/20220812002629/https:/www.attentive.com/product>.

Attentive. "Send Targeted and Personalized Two-Way Messages that Convert." Attentive Messaging, Sep. 24, 2021, 3 pages, [Online] [Retrieved Apr. 13, 2023], Retrieved from the Internet Archive <URL:https://web.archive.org/web/20210924022317/https:/www.attentivemobile.com/messaging>.

Attentive. "The Most Comprehensive Text Message Marketing Solution." Attentive.com, Aug. 3, 2022, 4 pages, [Online] [Retrieved Feb. 21, 2023], Retrieved from the Internet Archive <URL:https://web.archive.org/web/20220803215207/https://www.attentive.com/>.

Attentive. "Thread 2022 Keynote: Welcome to Conversational Commerce." YouTube.com, Oct. 24, 2022, 1 page, [Online] [Retrieved Apr. 13, 2023], Retrieved from the Internet <URL:https://www.youtube.com/watch?v=7h1af9i00IE&list=PLXIYoQe1qzOkW-kdEsaffv_T8agZd_tjM&index=3>.

Attentive. "Thread Bash." Attentive Thread: The Conference for Conversational Commerce, Keynote Presentation, Oct. 6-7, 2022, slides 1-125.

Attentive. "Welcome to Partner Text Talk (Live)." Attentive Presentation, Wednesday, Jun. 15, 2022, slides 1-55.

Big Commerce. "Attentive SMS Marketing." BigCommerce Pty. Ltd., May 20, 2022, 2 pages, [Online] [Retrieved Feb. 22, 2023], Retrieved from the Internet Archive <URL:https://web.archive.org/web/20220520210938/https://www.bigcommerce.com/apps/attentive-sms-marketing/>.

Bulander, R. et al. "Advertising via Mobile Terminals—Delivering Context Sensitive and Personalized Advertising While Guaranteeing Privacy." ICETE 2005, CCIS 3, Jan. 2005, pp. 15-25.

Bullard, B. "CCSO Introduces Alerts via Text, Email, Mobile App." The Cullman Times, Jan. 19, 2017, 3 pages, [Online] [Retrieved Feb. 22, 2023], Retrieved from the Internet <URL:https://www.cullmantimes.com/news/ccso-introduces-alerts-via-text-email-mobile-app/article_2163b686-de09-11e6-9523-b37d8770503b.html>.

Çinar, G. "Using Micro Location-Based Technologies in Mobile Marketing: Integration of SMS with Mass, Segmented and Location-Based Customer Data." M.Sc. Thesis, Istanbul Technical University, May 2015, pp. 1-81.

Constine, J. "Facebook Tests Buy Button to let You Purchase Stuff Without Leaving Facebook." TechCrunch: Media & Entertainment, Jul. 17, 2014, 5 pages, [Online] [Retrieved Feb. 22, 2023], Retrieved from the Internet <URL:https://techcrunch.com/2014/07/17/facebook-buy-button/>.

Constine, J. "FacePay?" TechCrunch: Media & Entertainment, Apr. 5, 2015, 7 pages, [Online] [Retrieved Feb. 22, 2023], Retrieved from the Internet <URL:https://techcrunch.com/2015/04/05/when-buying-is-as-easy-as-liking/>.

Debecker, A. "AdWords Click-to-Message Ads: A Comprehensive Guide." Ubisend: A Product of Soprano, Jan. 26, 2017, 8 pages, [Online] [Retrieved Feb. 16, 2023], Retrieved from the Internet <URL:https://blog.ubisend.com/optimise-chatbots/adwords-click-to-message-guide>.

Dworski, B. "Generational Marketing—Messaging Across Age Groups (with Infographics)." Attentive SMS Strategies, Nov. 17, 2021, 4 pages, [Online] [Retrieved Apr. 13, 2023], Retrieved from the Internet <URL:https://www.attentive.com/blog/how-to-master-multigenerational-marketing-using-personalized-text-messaging>.

Emotive. "Create and Edit Popups in Emotive (Shopify)." Emotive Help Center, Jul. 2021, 4 pages, [Online] [Retrieved Apr. 14, 2023], Retrieved from the Internet <URL:https://emotive.zendesk.com/hc/en-us/articles/4419515936919-Create-and-edit-popups-in-Emotive-Shopify->.

Emotive. "Let Your Phone Number and Email List Build Itself, Compliantly." Emotive: Build Your Subscriber List, Jul. 14, 2021, 3 pages, [Online] [Retrieved Apr. 14, 2023], Retrieved from the Internet <URL:https://emotive.io/product/build-your-subscriber-list>.

Emotive. "Setting Up Your Popup and Welcome Experience." Emotive Help Center, Jul. 2021, 3 pages, [Online] [Retrieved Apr. 14, 2023], Retrieved from the Internet <URL:https://emotive.zendesk.com/hc/en-us/articles/6147259585303-Setting-Up-Your-Popup-and-Welcome-Experience>.

Finn, G. "New 'Call-Only' Ad Types Arrives in Google AdWords to Make Mobile Easier." Search Engine Land, Feb. 20, 2015, 2 pages, [Online] [Retrieved Apr. 14, 2023], Retrieved from the Internet <URL:https://searchengineland.com/new-call-ad-types-arrives-google-adwords-make-mobile-easier-215213>.

Google. "Get Relevant Holiday Offers and Updates Texted Right to Your Phone." AdWords: Public, Nov. 10, 2015, 1 page, [Online] [Archived Jul. 30, 2017], Retrieved from the Internet Archive <URL:https://web.archive.org/web/20170730173508/https://plus.google.com/+GoogleAds/posts/BdED1JSTJZK>.

Google. "About Message Extensions." AdWords Help: Manage Ads, Oct. 28, 2016, 1 page, [Online] [Retrieved Apr. 17, 2023], Retrieved from the Internet Archive <URL:https://web.archive.org/web/20161028155710/https://support.google.com/adwords/answer/7172668?utm_source=inside_adwords&utm_medium=blog&utm_campaign=messaging>.

Internet Magazine. "How to Track Your Site's Visitors. (Expert Help)." EMAP Media Ltd., Feb. 2003, pp. 1-6.

Karr, D. "What is SMS Marketing? Terms, Definitions, Statistics . . . And the Future." Martech Zone: Mobile and Tablet Marketing, Dec. 29, 2022, 5 pages, [Online] [Retrieved Feb. 22, 2023], Retrieved from the Internet <URL:https://martech.zone/what-is-sms-marketing/>.

Kats, R. "Target Intensifies Mobile Coupon Push via Interactive Marketing Campaign." RetailDive, Sep. 18, 2019, 2 pages, [Online] [Retrieved Apr. 14, 2023], Retrieved from the Internet Archive <URL:https://web.archive.org/web/20190918082407/https://www.retaildive.com/ex/mobilecommercedaily/target-intensifies-mobile-coupon-push-via-interactive-marketing-campaign>.

Klaviyo Developers. "Integrate with a Shopify Hydrogen Store." Guides, Jul. 2022, 4 pages, [Online] [Retrieved Feb. 22, 2023], Retrieved from the Internet <URL:https://developers.klaviyo.com/en/v1-2/docs/integrate-with-a-shopify-hydrogen-store>.

Klaviyo Developers. "Set Up Back in Stock via API: Learn How to Set up Klaviyo's Back in Stock Functionality via API." Guides, Jul. 2022, 2 pages, [Online] [Retrieved Feb. 22, 2023], Retrieved from the Internet <URL:https://developers.klaviyo.com/en/v1-2/docs/how-to-set-up-custom-back-in-stock>.

Klaviyo. "Integrate Your Store: Drive More Revenue with Your Ecommerce Platforms (Yes, Yours)." Klaviyo.com, Dec. 4, 2016, 2 pages, [Online] [Retrieved Feb. 22, 2023], Retrieved from the Internet <URL:https://www.klaviyo.com/ecommerce-integrations>.

Klaviyo. "Klaviyo's Shopify Integration: Email Marketing Trusted by 65,000+ Shopify Brands." Klaviyo.com, Jun. 10, 2016, 3 pages, [Online] [Retrieved Feb. 22, 2023], Retrieved from the Internet <URL:https://www.klaviyo.com/ecommerce-integrations/shopify>.

Liu, K. H. "A Taxonomy and Business Analysis for Mobile Web Applications." Master of Science in Management and Engineering, Massachusetts Institute of Technology, Feb. 2009, pp. 1-115.

Marvin, G. "Google AdWords Click-to-Text Message Extension is Coming out of Beta." Search Engine Land, Oct. 18, 2016, 2 pages, [Online] [Retrieved Apr. 14, 2023], Retrieved from the Internet <URL:https://searchengineland.com/click-to-message-extension-google-adwords-launch-261228>.

(56) References Cited

OTHER PUBLICATIONS

Morrison, S. A. "Scary New Ways the Internet Profiles You: Facebook, Google, and the other Internet titans have ever more sophisticated and intrusive methods of mining your data, and that's just the tip of the iceberg." The Newsweek/Daily Beast Company LLC, Feb. 8, 2016, 8 pages, [Online] [Retrieved Apr. 14, 2023], Retrieved from the Internet <URL:https://www.thedailybeast.com/scary-new-ways-the-internet-profiles-you>.

Nilsson, E. "SMS Marketing for Mainland China: A Study on the Preferences in Push and Pull Ads." Independent Thesis, Örebro University, Department of Business, Economics, Statistics and Informatics, Jan. 24, 2007, pp. 1-46.

PENTIUM10. "How to Initiate/Send SMS from a HTML5 Webpage Using Devices Native Functions." Stack Overflow Questions, Apr. 19, 2011, 2 pages, [Online] [Retrieved Apr. 14, 2023], Retrieved from the Internet <URL:https://stackoverflow.com/questions/5721437/how-to-initiate-send-sms-from-a-html5-webpage-using-devices-native-functions>.

Postscript. "SMS Marketing for Growing Shopify Stores." Postscript.io, Sep. 4, 2021, 2 pages, [Online] [Retrieved Feb. 22, 2023], Retrieved from the Internet Archive <URL:https://web.archive.org/web/20210904221315/https://www.postscript.io/>.

Postscript. "SMS Marketing for Shopify. See it in Action." Postscript.io, Product: Features, Sep. 18, 2021, 3 pages, [Online] [Retrieved Feb. 22, 2023], Retrieved from the Internet Archive <URL:https://web.archive.org/web/20210918231813/https://www.postscript.io/features/>.

Roberts, D. "Click-to-Message Ads—A New Way to Talk to Customers." Search Engine Hubbub, Nov. 15, 2016, 5 pages, [Online] [Retrieved Feb. 22, 2023], Retrieved from the Internet <URL:https://searchenginehubbub.com/mobile/click-to-message-ads/>.

Rothman, W. "Amazon 'Simple' TextBuyIt Text-Message Shopping Sounds Complicated." Gizmodo: The Future is Here, Apr. 2, 2008, 5 pages, [Online] [Retrieved Feb. 22, 2023], Retrieved from the Internet <URL:https://gizmodo.com/amazon-simple-textbuyit-text-message-shopping-sounds-375115>.

Salz, P. A. "Teams Work: Social Search Gets Results." EContent, Information Today, Inc., vol. 30, No. 9, Nov. 2007, pp. 1-8.

Sanford, M. "Why Text Message Abandoned Cart Reminders Outperform Email." Attentive Text Talk, Dec. 17, 2018, 2 pages, [Online] [Retrieved Apr. 13, 2023], Retrieved from the Internet <URL:https://www.attentive.com/blog/abandoned-cart-reminders>.

Schwartz, B. "Google AdWords Testing Click to SMS Ad Extension." Search Engine Land, Jun. 17, 2016, 3 pages, [Online] [Retrieved Feb. 16, 2023], Retrieved from the Internet <URL:https://searchengineland.com/google-adwords-testing-click-sms-ad-extension-252214>.

Schwartz, B. "Google AdWords Testing SMS Alert Ad Format." Search Engine Roundtable, Nov. 11, 2015, 3 pages, [Online] [Retrieved Apr. 14, 2023], Retrieved from the Internet <URL:https://www.seroundtable.com/google-adwords-sms-ads-21175.html>.

Shopify App Store. "Attentive: SMS +MMS Marketing." Developer: Attentive, Jul. 2, 2020, 2 pages, [Online] [Retrieved Feb. 22, 2023], Retrieved from the Internet <URL:https://apps.shopify.com/attentive?st_campaign=listing&st_source=plus_directory>.

Shopify App Store. "Emotive: SMS Marketing." Developer: Emotive, May 27, 2022, 2 pages, [Online] [Retrieved Feb. 22, 2023], Retrieved from the Internet <URL:https://apps.shopify.com/emotive?st_campaign=listing&st_source=plus_directory>.

Shopify App Store. "Klaviyo: Email Marketing & SMS." Developer: Klaviyo, Sep. 20, 2012, 3 pages, [Online] [Retrieved Feb. 22, 2023], Retrieved from the Internet <URL:https://apps.shopify.com/klaviyo-email-marketing>.

Shopify. "Attentive: SMS +MMS Marketing." By Attentive, Oct. 28, 2021, 3 pages, [Online] [Retrieved Feb. 22, 2023], Retrieved from the Internet Archive <URL:https://web.archive.org/web/20211028032714/https:/apps.shopify.com/attentive?st_campaign=listing& st_source=plus_directory>.

Thiga, M. M. et al. "An SMS and USSD Model for Location-Based Mobile Advertising." International Journal of Computer Science & Engineering (IJCSET), vol. 4, No. 7, Jul. 2013, pp. 1070-1083.

Tribulant. "How to Create Phone Call & Text Links." Tribulant Blog, Mar. 10, 2016, 4 pages, [Online] [Retrieved Apr. 14, 2023], Retrieved from the Internet <URL:https://tribulant.com/blog/wordpress/how-to-create-phone-call-text-links/>.

Wilde, E. et al. "URI Scheme for Global System for Mobile Communications (GSM) Short Message Service (SMS)." Internet Engineering Task Force (IETF), Jan. 2010, pp. 1-18.

Feig, N. "Authentication Goes Mobile: Banks Look to Out-of-Band Authentication as Customers Seek Enhanced Online Banking Security." Bank Systems +Technology, vol. 23, No. 1, Nov. 2007, 3 pages.

Klaviyo. "Campaign Management Software: SMS and Email Campaigns Made Simple and Seamless." Klaviyo.com, 2022, 9 pages, [Online] [Retrieved Nov. 1, 2022], Retrieved from the Internet <URL:https://www.klaviyo.com/features/campaigns>.

Klaviyo. "Klaviyo: Email Marketing & SMS." Shopify App Store, Sep. 20, 2012, 1 pages, [Online] [Retrieved Nov. 1, 2022], Retrieved from the Internet <URL:https://apps.shopify.com/klaviyo-email-marketing>.

Nicholson, A.J. et al., "Mobile Device Security Using Transient Authentication," IEEE Transactions on Mobile Computing, vol. 5, No. 11, Nov. 2006, pp. 1489-1502.

PCT International Search Report and Written Opinion, PCT Application No. PCT/US2020/044901, Nov. 6, 2020, ten pages.

PCT International Search Report and Written Opinion, PCT Application No. PCT/US2016/056106, Dec. 29, 2016, six pages.

Richmond, R. "Hotmail's New Security Features." The New York Times, May 19, 2010, 3 pages, [Online] [Retrieved Nov. 3, 2022], Retrieved from the Internet <URL:https://archive.nytimes.com/gadgetwise.blogs.nytimes.com/2010/05/19/hotmails-new-security-features/>.

Shopify. "Event." Shopify.dev, Apr. 2022, 8 pages, [Online] [Retrieved Nov. 1, 2022], Retrieved from the Internet <URL:https://shopify.dev/api/admin-rest/2022-04/resources/event>.

Shopify. "Webhook." Shopify.dev, Apr. 2022, 8 pages, [Online] [Retrieved Nov. 1, 2022], Retrieved from the Internet <URL:https://shopify.dev/api/admin-rest/2022-04/resources/webhook>.

Singh, K. "User Reachability in Multi-Apps Environment." Proceedings of IEEE International Symposium on Multimedia (IEEE ISM), Dec. 14-16, 2015, pp. 1-6.

Solano, A. et al. "One-Time URL: A Proximity Security Mechanism Between Internet of Things and Mobile Devices." Sensors, vol. 16, No. 10, Oct. 2016, pp. 1-17.

Teeley, A. "Who Thought up Klaviyo's New SMS Product? Its Customers." Built In Boston, Dec. 4, 2019, 16 pages, [Online] [Retrieved Nov. 1, 2022], Retrieved from the Internet <URL:https://www.builtinboston.com/spotlight/2019/12/04/klaviyo-careers-customer-success-product>.

United States Office Action, U.S. Appl. No. 15/986,569, filed Jun. 26, 2020, 25 pages.

United States Office Action, U.S. Appl. No. 15/986,569, filed Feb. 20, 2020, 23 pages.

United States Office Action, U.S. Appl. No. 15/986,569, filed Aug. 8, 2019, 15 pages.

United States Office Action, U.S. Appl. No. 15/986,569, filed Mar. 21, 2019, 15 pages.

United States Office Action, U.S. Appl. No. 15/986,569, filed Oct. 29, 2018, 14 pages.

United States Office Action, U.S. Appl. No. 17/114,937, filed May 12, 2021, 15 pages.

United States Office Action, U.S. Appl. No. 17/114,937, filed Mar. 4, 2021, 12 pages.

United States Office Action, U.S. Appl. No. 17/114,937, filed Jul. 22, 2021, 13 pages.

United States Office Action, U.S. Appl. No. 17/496,590, filed Mar. 4, 2022, 40 pages.

United States Provisional U.S. Appl. No. 62/238,383, filed Oct. 7, 2015, Inventors Anthony Saia and Joshua Manley (not enclosed).

(56) References Cited

OTHER PUBLICATIONS

Webpage, Amazon TextBuyIt FAQ—Amazon Payments, Jul. 27, 2011, two pages, [Online], URL: <https://payments.amazon.com/sdui/sdui/helpTab/Peronal-Accounts/TextBuyIt-FAQ>.

United States Office Action, U.S. Appl. No. 18/234,857, filed Dec. 15, 2023, 41 pages.

United States District Court for the District of Delaware, C.A. No. 23-087 (CJB), *Attentive Mobile Inc.* v. *Stodge Inc. d/b/a Postscript*, "Attentive's Preliminary Invalidity Contentions," Dec. 18, 2023, pp. 1-24.

United States District Court for the District of Delaware, C.A. No. 23-087 (CJB), *Attentive Mobile Inc.* v. *Stodge Inc. d/b/a Postscript*, "Exhibit 103: Invalidity of U.S. Pat. No. 11,709,660 Under AIA Section 103," Dec. 18, 2023, pp. 1-418.

United States District Court for the District of Delaware, C.A. No. 23-087 (CJB), *Attentive Mobile Inc.* v. *Stodge Inc. d/b/a Postscript*, "Exhibit 1: Invalidity of U.S. Pat. No. 11,709,660 Under AIA Section 102 or Section 103 in view of U.S. Patent Application Publication No. 20210241315A1," Dec. 18, 2023, pp. 1-91.

United States District Court for the District of Delaware, C.A. No. 23-087 (CJB), *Attentive Mobile Inc.* v. *Stodge Inc. d/b/a Postscript*, "Exhibit 2: Invalidity of U.S. Pat. No. 11,709,660 Under AIA Section 102 or Section 103 in view of U.S. Patent Application Publication No. 20210044555A1," Dec. 18, 2023, pp. 1-108.

United States District Court for the District of Delaware, C.A. No. 23-087 (CJB), *Attentive Mobile Inc.* v. *Stodge Inc. d/b/a Postscript*, "Exhibit 3: Invalidity of U.S. Pat. No. 11,709,660 Under AIA Section 102 or Section 103 in view of U.S. Patent Application Publication No. 20200118161A1," Dec. 18, 2023, pp. 1-101.

United States District Court for the District of Delaware, C.A. No. 23-087 (CJB), *Attentive Mobile Inc.* v. *Stodge Inc. d/b/a Postscript*, "Exhibit 7: Invalidity of U.S. Pat. No. 11,709,660 Under AIA Section 102 or Section 103 in view of Klaviyo Marketing Platform," Dec. 18, 2023, pp. 1-68.

United States District Court for the District of Delaware, C.A. No. 23-087 (CJB), *Attentive Mobile Inc.* v. *Stodge Inc. d/b/a Postscript*, "Counter-Defendant Attentive Mobile's Reply in Support of Motion for Judgment on the Pleadings Pursuant to Fed. R. CIV. P. 12(C)," Apr. 11, 2024, pp. 1-15.

United States District Court for the District of Delaware, C.A. No. 23-087 (CJB), *Attentive Mobile Inc.* v. *Stodge Inc. d/b/a Postscript*, "Defendant and Counterclaimant Stodge Inc. D/B/A Postscript's Answering Brief in Opposition to Plaintiff and Counter-Defendant Attentive Mobile Inc.'s Motion for Judgment on the Pleadings." Apr. 11, 2024, pp. 1-26.

United States District Court for the District of Delaware, C.A. No. 23-087 (CJB), *Attentive Mobile Inc.* v. *Stodge Inc. d/b/a Postscript*, "Counter-Defendant Attentive Mobile's Brief in Support of Motion for Judgment on the Pleadings Pursuant to FED. R. CIV. P. 12(C)," Mar. 4, 2024, pp. 1-26.

United States District Court for the District of Delaware, C.A. No. 23-087 (CJB), *Attentive Mobile Inc.* v. *Stodge Inc. d/b/a Postscript*, "Attentive Mobile Inc.'s Answer and Counterclaims to Stodge Inc. d/b/a Postscript's Counterclaims," Oct. 16, 2023, pp. 1-36.

United States District Court for the District of Delaware, C.A. No. 23-087 (CJB), *Attentive Mobile Inc.* v. *Stodge Inc. d/b/a Postscript*, "Exhibits 1 through 12 to Plaintiff's Answer," Oct. 16, 2023, pp. 1-135.

United States Office Action, U.S. Appl. No. 18/330,244, filed Jul. 25, 2024, 34 pages.

Attentive. "Journeys: High Intent Purchasers—Concierge." Joined a Segment: Flowchart, Aug. 30, 2022, pp. 1-2.

Attentive. "Journeys: VIP Purchasers—Concierge." Joined a Segment: Flowchart, Aug. 30, 2022, pp. 1-4.

*Attentive Mobile Inc.*, v. *Stodge Inc. d/b/a Postscript*, in the United States District Court for the District of Delaware, C.A. No. 23-087 (CJB), "Concise Statement of Facts in Support of Plaintiff and Counterclaim-Defendant Attentive Mobile Inc.'S Motion for Summary Judgment of Invalidity of U.S. Pat. No. 11,709,660 Under 35 U.S.C. § 101," Dec. 3, 2024, pp. 1-6.

*Attentive Mobile Inc.*, v. *Stodge Inc. d/b/a Postscript*, in the United States District Court for the District of Delaware, C.A. No. 23-087 (CJB), "Plaintiff and Counterclaim-Defendant Attentive Mobile Inc.'S Motion for Summary Judgment of Invalidity of U.S. Pat. No. 11,709,660 Under 35 U.S.C. § 101," Dec. 3, 2024, pp. 1-5.

*Attentive Mobile Inc.*, v. *Stodge Inc. d/b/a Postscript*, in the United States District Court for the District of Delaware, C.A. No. 23-087 (CJB), "Plaintiff and Counterclaim- Defendant Attentive Mobile Inc.'S Opening Brief in Support of Its Motion for Summary Judgment of Invalidity of U.S. Pat. No. 11,709,660 Under 35 U.S.C. § 101," Dec. 3, 2024, pp. 1-25.

Amato, D. "Attentive Product Spotlight: vol. 2." Attentive News, Jun. 30, 2022, p. 2, [Online] [Retrieved Dec. 27, 2023], Retrieved from the Internet <URL:https://www.attentive.com/blog/june-product-spotlight>.

Attentive. "Attentive Product Overview." Attentive Presentation, Mar. 17, 2023, slides 5 and 21.

Attentive. "Discover a New Marketing Channel Built for E-Commerce and Retail Brands." Attentive Presentation, Jun. 2022, slide 25.

Attentive. "FAQs: Branching on Segments." Attentive Journeys, May 10, 2022, p. 1, [Online] [Retrieved Dec. 27, 2023], Retrieved from the Internet <URL:https://help.attentivemobile.com/hc/en-us/articles/360061985031-FAQs-Branching-on-segments#can-i-make-a-new-segment-to-branch-on-or-do-i-have-to-use-existing-ones—0-0>.

Attentive. "How Mented Cosmetics Optimizes Their Text Messaging Program Through Segmentation." Attentive Beauty, Nov. 19, 2020, p. 1, [Online] [Retrieved Dec. 28, 2023], Retrieved from the Internet <URL:https://www.attentive.com/case-studies/how-mented-cosmetics-optimizes-their-text-messaging-program-through-segmentation>.

Attentive. "How PAWZ uses Attentive's Journeys to Send Triggered Messages to Subscribers, Contributing to $4.6M in SMS Revenue." Attentive Apparel, Jul. 24, 2021, pp. 1-2, [Online] [Retrieved Dec. 28, 2023], Retrieved from the Internet Archive <URL:https://web.archive.org/web/20210724001804/https:/www.attentivemobile.com/case-studies/how-pawz-uses-attentives-journeys-to-send-triggered-messages-to-subscribers-contributing-to-3-5m-in-sms-revenue>.

Emotive. "Get a 5X Roi Guaranteed* with Your Shopify SMS Marketing." Emotive.io, Jan. 21, 2022, p. 2, [Online] [Retrieved Dec. 28, 2023], Retrieved from the Internet Archive <URL:https://web.archive.org/web/20220121141834/https://emotive.io/sms-integrations/shopify-text-message-marketing-app>.

Jandreau-Smith, S. "SMS Segmentation: Implementing Your Strategy." Attentive SMS Strategies, Jul. 22, 2021, pp. 1-2, [Online] [Retrieved Dec. 28, 2023], Retrieved from the Internet <URL:https://www.attentive.com/blog/sms-segmentation-implementing-your-strategy>.

Khoury, L. "Attentive Announces the Next Step in Journeys, a Better way to Send In-The-Moment, Personalized Text Messages." Attentive News, May 13, 2020, p. 1, [Online] [Retrieved Dec. 28, 2023], Retrieved from the Internet <URL:https://www.attentive.com/blog/attentive-journeys>.

PCT International Search Report and Written Opinion, PCT Application No. PCT/US2022/046438, Jun. 27, 2023, 11 pages.

Ponce, V., et al. "Context-Aware End-User Development Review," MDPI Applied Sciences, vol. 12, Issue 1, Jan. 4, 2022, pp. 1-29.

Sanford, M. "SMS Marketing for Shopify Merchants: Everything you Need to get Started." Attentive, SMS Strategies, Jun. 21, 2022, pp. 2-3, [Online] [Retrieved Dec. 28, 2023], Retrieved from the Internet <URL:https://www.attentive.com/blog/shopify-sms-marketing>.

Simchi, A. "3 Ways to Leverage Your SMS List Growth in the New Year." Attentive SMS Strategies, Jan. 11, 2021, p. 1, [Online] [Retrieved Dec. 28, 2023], Retrieved from the Internet <URL:https://www.attentive.com/blog/3-ways-to-leverage-your-sms-list-growth-in-the-new-year>.

*Attentive Mobile Inc.*, v. *Stodge Inc. d/b/a Postscript*, in the United States District Court for the District of Delaware, C.A. No. 23-087 (CJB), "Opening Expert Report of Nathaniel Polish, Ph.D. Regarding Invalidity of U.S. Pat. No. 11,709,660," Sep. 27, 2024, pp. 1-127.

(56) References Cited

OTHER PUBLICATIONS

*Attentive Mobile Inc., v. Stodge Inc. d/b/a Postscript*, in the United States District Court for the District of Delaware, C.A. No. 23-087 (CJB), "Exhibit A: Nathaniel Polish, Ph.D. Curriculum Vitae," Sep. 27, 2024, pp. 1-5.

*Attentive Mobile Inc., v. Stodge Inc. d/b/a Postscript*, in the United States District Court for the District of Delaware, C.A. No. 23-087 (CJB), "Exhibit B: List of Materials Considered," Sep. 27, 2024, pp. 1-4.

*Attentive Mobile Inc., v. Stodge Inc. d/b/a Postscript*, in the United States District Court for the District of Delaware, C.A. No. 23-087 (CJB), "Exhibit C: Attentive's Final Invalidity Contentions for the '660 Patent Supplemented on Sep. 16, 2024," Sep. 27, 2024, pp. 1-44.

*Attentive Mobile Inc., v. Stodge Inc. d/b/a Postscript*, in the United States District Court for the District of Delaware, C.A. No. 23-087 (CJB), "Exhibit D: Attentive's Final Invalidity Contentions: Invalidity of the '660 Patent Over U.S. Patent Application Publication No. 2021/0241315 ("Clark")," Sep. 27, 2024, pp. 1-91.

*Attentive Mobile Inc., v. Stodge Inc. d/b/a Postscript*, in the United States District Court for the District of Delaware, C.A. No. 23-087 (CJB), "Exhibit E: Attentive's Final Invalidity Contentions: Invalidity of the '660 Patent Over U.S. Patent Application Publication No. 2021/0044555 ("Orr")," Sep. 27, 2024, pp. 1-108.

*Attentive Mobile Inc., v. Stodge Inc. d/b/a Postscript*, in the United States District Court for the District of Delaware, C.A. No. 23-087 (CJB), "Exhibit F: Attentive's Final Invalidity Contentions: Invalidity of the '660 Patent Over U.S. Patent Application Publication No. 2020/0118161 ("Samuel")," Sep. 27, 2024, pp. 1-101.

*Attentive Mobile Inc., v. Stodge Inc. d/b/a Postscript*, in the United States District Court for the District of Delaware, C.A. No. 23-087 (CJB), "Exhibit J: Attentive's Final Invalidity Contentions: Invalidity of the '660 Patent Over Klaviyo's Flows ("Klaviyo")," Sep. 27, 2024, pp. 1-68.

*Attentive Mobile Inc., v. Stodge Inc. d/b/a Postscript*, in the United States District Court for the District of Delaware, C.A. No. 23-087 (CJB), "Exhibit K: Attentive's Final Invalidity Contentions: Invalidity of the '660 Patent Over Under AIA Section 103," Sep. 27, 2024, pp. 1-418.

Attentive Mobile Inc., v. Stodge Inc. d/b/a Postscript, in the United States District Court for the District of Delaware, C.A. No. 23-087 (Cjb), "Exhibit L: Attentive's Final Invalidity Contentions: Invalidity of the '660 Patent Over Postscript's Campaign Flows ("Campaign Flows")," Sep. 27, 2024, pp. 1-52.

* cited by examiner

```
{
  "time_created": "2022-10-07T09:21:52",
  "id": 3948249,
  "body": {...},
  "description": "Order Shipped",
  "order_id": 231098434,
  "subject_type": "Shipment",
  ...
}
```
260, 270, 262

```
"body": {
  "app_identifier" : 1249032235
  "IP_address": 342.213.23.102
  ...
  "customer":
  {
    "id": 207119551,
    "email": "john.doe@abc.com",
    "phone": "+16507778888",
    ...
  },
  ...
  "order":
  {
    "items" = ["item_id": 34295493, "item_id": 32546556, ...]
    ...
  }
  ...
}
```
272, 274, 282, 284, 286, 292, 294, 270

INTEGRATED THIRD-PARTY APPLICATION BUILDER TRIGGER FOR MESSAGE FLOW

CROSS-REFERENCE TO RELATED APPLICATION

This application claims the benefit of priority from U.S. Provisional Application No. 63/415,600, filed Oct. 12, 2022, which is herein incorporated by reference in its entirety.

This application also relates to International Application No. PCT/US2022/046438, filed Oct. 12, 2022, U.S. application Ser. No. 17/964,825, filed Oct. 12, 2022, and U.S. application Ser. No. 18/330,244, filed Jun. 6, 2023, which are herein incorporated by reference in their entirety.

TECHNICAL FIELD

The present disclosure generally relates to a server that distributes messages to recipients on behalf of application operators and, more specifically, configuration of trigger conditions for receiving application programming interface notification from the application building platform.

BACKGROUND

Network communications to a mass audience can often be challenging as communications channels are often associated with their own requirements, protocols, formats and limitations. An organization often encounters technical difficulties in managing proper message transmission. In addition, identification of audience and determination of proper timing to transmit the proper communications are not a trivial task. An organization may not be equipped with the technical specialty to deliver network communications in an effective manner without the proper technical specialty. The issue could be especially challenging if messages are related to functionalities that are not operated by the organization.

BRIEF DESCRIPTION OF THE DRAWINGS

FIG. 2B is a conceptual diagram illustrating an example payload of an API notification, such as a webhook notification, provided by the application builder platform, in accordance with some embodiments.

Figure 9:
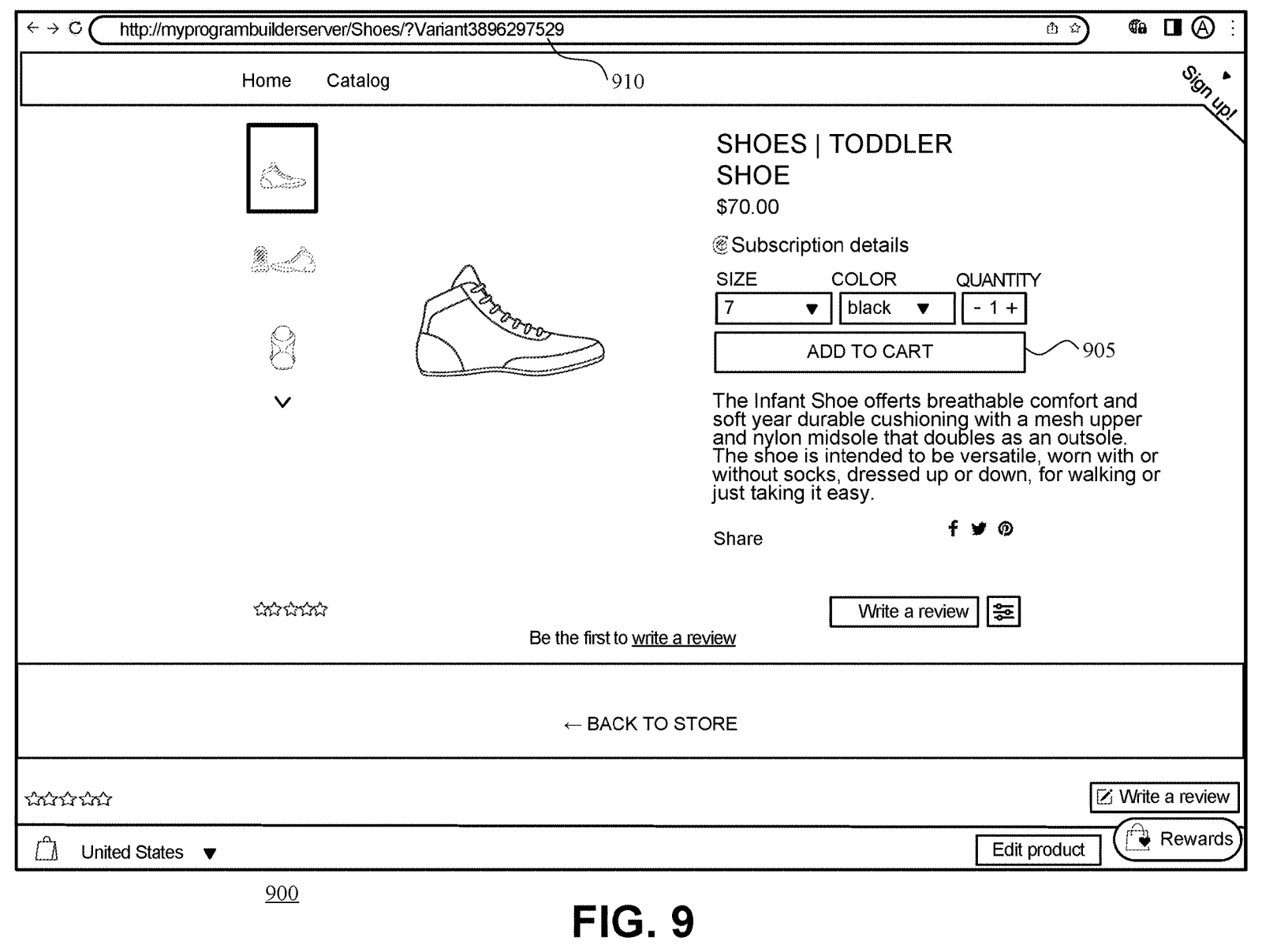

FIG. 9 is an example of a webpage associated with an application operator where end user activity may cause detection of a trigger condition associated with a flow plan, in accordance with some embodiments.

Figure 1:
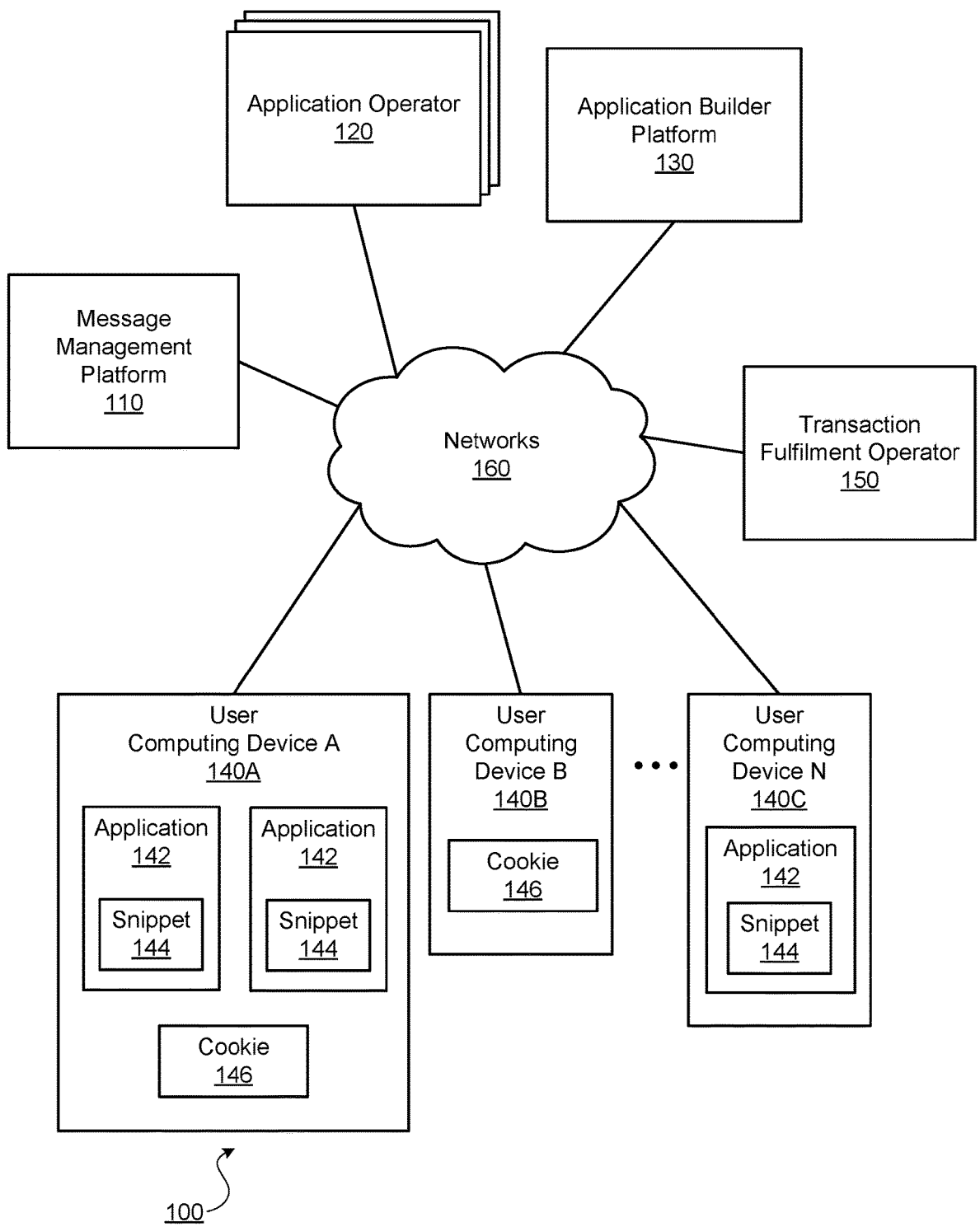
FIG. 1 is a block diagram illustrating an example system environment, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed embodiments herein are related to a message management platform that allows application operators to build message flow plans (e.g., message campaigns and message automation). Messages (e.g., SMS messages) based on the message flow plans are transmitted to user computing devices of end users (e.g., subscribers) who have opted-in to receive messages from specific application operators (or from specific flow plans of the specific publishers). An application operator may utilize a flow builder of the platform to create and launch one or more message flow plans for carrying out different message series for different end users to the message flow plan based on trigger conditions of the message flow plan.

The application operator may set as a message trigger condition for an initial message to be transmitted under a flow plan, target recipient criteria for selecting a group of end users from among all of the end users to the application operator who are to receive messages under the message flow plan. The message management platform may then automatically identify and transmit the initial message based on the target recipient criteria for the message flow plan to the target group of end users. The application operator may further set exclusion trigger conditions for the message flow plan based on which an end user may be temporarily excluded or permanently removed from the group of end users and thereby preventing a further message from being sent to the end user under the message flow plan. The message management platform may automatically identify and stop the transmission of messages to the end user when the exclusion trigger condition is detected with respect to the end user. The application operator may also configure the message flow plan to have different message series (e.g., different branches) by setting different trigger conditions (e.g., event-based triggers, publisher-configured triggers). The message management platform may thus automatically identify and transmit the different message series (each including one or more messages) to the different end users of the group based on the trigger conditions of the message flow plan.

Example System Environment

Referring now to Figure (FIG. 1, shown is a block diagram illustrating an embodiment of an example system environment 100 for distributing messages based on various triggers, in accordance with some embodiments. By way of example, the system environment 100 includes a message management platform 110, application operators 120, an application builder platform 130, user computing devices 140, and a transaction fulfillment operator 150. The user computing devices 140 may be collectively referred to by the reference number 140 or individually as 140A, 140B, . . . , 140N (N being an nth device, n being some number). The entities and components in the system environment 100 may communicate with each other through networks 160.

In various embodiments, the system environment 100 may include fewer or additional components. The system environment 100 also may include different components. Also, while some of the components in the system environment 100 may sometimes be described in a singular form, the system environment 100 may include one or more of each of the components. For example, there may be multiple application operators 120 and multiple user computing devices 140. Various application operators 120 may be independent entities such as different enterprise customers of the message management platform 110, which serves as a service provider that manages the message distribution and associated actions on behalf of the application operators 120. Also, while the terms such as "server" and "operator" is used in the singular form, those terms may each include multiple instances that cooperatively or collectively perform certain functions or processes described in this disclosure. For example, a "server" may include a group of servers that are operated under a single entity or multiple entities under contract to provide various services. Each server in the group may perform a different function.

In the system environment 100, various components may be operated by the same organization or different organizations. For example, in some embodiments, the message management platform 110, the application operator 120, the application builder platform 130, and the channel 150 are each operated by a different business. In some embodiments, two or more components may be operated by the same organization. For example, the organization that controls the application builder platform 130 may also be the transaction fulfillment operator 150.

The message management platform 110 may include one or more computing servers that perform various tasks related to managing communication elements (messages, data payloads, and other forms of communications) on behalf of application operators 120. The message management platform 110 may refer to the party that operates the message management platform 110. The communication managing tasks may include providing a frontend software platform (e.g., a message flow builder in the form of a software-as-a-service SaaS platform), transmitting communication elements to various user computing devices 140 on behalf of the different application operators 120, determining conditions and target audience to transmit those communications, transmitting a series of messages based on triggered conditions, receiving responses from user computing devices 140, forwarding the responses to the application operators 120, and/or taking actions on behalf of the application operators 120.

US Patent Application Publication No. 2022/0198431, entitled "Text Messaging Service Based Commerce System," published on Jun. 23, 2022, is incorporated herein by reference for all purposes.

The messages managed and distributed by the message management platform 110 may include different types of messages such as text messaging services (e.g., short message service (SMS), multimedia messaging service (MMS)), emails (e.g., mobile emails, plain text emails, browser emails), push notification protocols (e.g., APPLE push notification, ANDROID push notification), instant messaging applications (WHATSAPP, WECHAT, TELEGRAM), in-application messages (e.g., messages sent within a mobile application), social networking systems (e.g., FACEBOOK, TWITTER), RSS feeds, web browser notifications, other suitable protocols such as simply message payloads sent as an Internet packet or a series of packets. In some embodiments, the message management platform 110 may focus on a single type of message such as a text messaging service (SMS and MMS).

By way of example, the message management platform 110 may provide a platform for an application operator 120 to design and configure an automated SMS message flow. According to the message flow, the message management platform 110 may send one or more SMS messages on behalf of the application operator 120 to a user computing device 140 based on various triggers that may be related to time, event, transaction, sequence, and/or response. The message management platform 110 may receive SMS messages from the user computing device 140 and may forward SMS messages to the application operator 120. In some embodiments, the message management platform 110 may provide a platform that connects the application operator 120 and the user computing device 140 to allow the two parties to communicate via SMS in real time. While SMS messaging may be used as the primary example throughout this disclosure, various features described may be expanded to other types of communications.

The message management platform 110 may be operated by an entity that uses a combination of hardware and software to build and operate the platform. A computing server used by the message management platform 110 may include some or all example components of a computing machine described in FIG. 10. The message management platform 110 may sometimes be referred to as a messaging platform or simply a computing server. The message management platform 110 may include a computing server that takes different forms. In some embodiments, the message management platform 110 may be a server computer that executes code instructions to perform various processes described herein. In some embodiments, the message management platform 110 may be a pool of computing devices that may be located at the same geographical location (e.g., a server room) or be distributed geographically (e.g., cloud-ing computing, distributed computing, or in a virtual server network). In some embodiments, the message management platform 110 may be a collection of servers that cooperatively provide messaging services as described. The message management platform 110 may also include one or more virtualization instances such as a container, a virtual machine, a virtual private server, a virtual kernel, or another suitable virtualization instance. The message management platform 110 may provide application operators 120 with various message management services and merchant services as a form of cloud-based software, such as software as a service (SaaS), through the network 160. Examples of components and functionalities of the message management platform 110 are discussed in further detail below with reference to FIG. 3.

Application operators 120 are entities that control software applications 142 that are used by user computing devices 140. For example, an application operator 120 can be an application publisher that publishes mobile applications available through application stores (e.g., APPLE APP STORE, ANDROID STORE). In some cases, the application may take the form of a website and the application operator 120 is the website owner. In some embodiments, the application operators 120 are businesses that provide goods and/or services to end users who possess the user computing devices 140. In some embodiments, an application operator 120 sells products through an application 142 and may be referred to as a merchant. In the system environment 100, the application operators 120 may be the customers of the message management platform 110 and the customers of the application builder platform 130.

An application operator 120 may interact directly with its customers or end users in certain aspects, and may delegate certain operations, such as sending messages, to the message management platform 110. An application operator 120 may maintain accounts of its users and manage day-to-day interactions with the users while directing the message management platform 110 to distribute messages to the users on behalf of the application operator 120. For example, the application operator 120 may use a platform provided by the message management platform 110 to design messages and set conditions, branches, and intended recipients of the messages. The application operator 120, through the message management platform 110, may launch a message flow that includes a series of messages to be automatically delivered to various user computing devices 140.

By way of example, an application operator 120 may be a retail business that operates an electronic retail platform in an application 142 and uses the service of the message management platform 110 to communicate order and shipment information to various user computing devices 140. In another example, another retail business may use the message management platform 110 to transmit marketing and promotional communications (e.g., advertisements, gift cards, coupons, store credits, and receipts) in various forms of messages to user computing devices 140. In yet another example, an application operator 120 may be a retail company that hires the message management platform 110 to send SMS offers to its customers and the customers may make a purchase by directly responding to the SMS message. These are non-exhaustive examples of application operators 120. Various application operators 120 may be independent and unrelated entities, such as different unrelated businesses.

In some embodiments, a message may be considered to be transmitted from the application operator 120 regardless of whether the message publisher's server directly sends the message or the message management platform 110 sends the message.

An application builder platform 130 may include one or more computing servers that perform various tasks related to assisting application operators 120 to build applications 142, providing ready-to-use functionalities to those applications 142, operating a digital distribution platform that provides a selection of third-party functionalities that can be integrated into applications 142, providing back-end functionalities for applications 142, and/or performing actions such as fulfillment for transactions that are completed through applications 142. The application builder platform 130 may refer to the party that operates the application builder platform 130. By way of example, the application builder platform 130 may be an e-commerce platform, such as SHOPIFY, that allows application operators 120 to build an application 142, which may take the form of a mobile application, a website, or a software program, on the platform of the application builder platform 130. The application builder platform 130 may also be referred to as an e-commerce platform, a backend shopping cart platform, or a website builder platform. The application 142 built using the platform may automatically incorporate certain standard features provided by the application builder platform 130, such as the checkout feature, shopping cart, payment management, and inventory management features provided by the application builder platform 130. Hence, the application operator 120 may design, for example, a website using the platform and the website will automatically have e-commerce features. The application builder platform 130 may further provide a digital distribution platform on which various third-party features are distributed. In some embodiments, the message management platform 110 may upload a code snippet (e.g., in the form of an applet, a software development kit (SDK)) to the digital distribution platform. An application operator 120 adding the applet to the application 142 makes the application 142 have additional features that are provided by the applet in communication with the message management platform 110.

With respect to the relationship between the application operator 120 and the application builder platform 130, while the application operator 120 is the operator of an application 142, the application operator 120 may not need to run the application in terms of the application's day-to-day software and hardware operations. The application operator 120 may control the application 142 in the business sense, such as being the owner of the application 142. For example, a retail merchant application operator 120 may own its retail website or retail mobile application. However, an application operator 120 may delegate the application's day-to-day software and hardware operations to the application builder platform 130. As such, in some embodiments, an application operator 120 may also be referred to as an application owner, an application publisher, a business, a service provider, and/or a merchant. In some embodiments, the application operator 120 may run some part of the day-to-day software and hardware operations of its application 142 while the application builder platform 130 provides support and additional features (e.g., e-commerce capability, backend, and platform) to the application 142.

The application builder platform 130 may be operated by an entity that uses a combination of hardware and software to build and operate the platform. The application builder platform 130 may include some or all example components of a computing machine described in FIG. 10. The application builder platform 130 may sometimes be referred to as a website builder server, an e-commerce platform, an online-store building platform, or simply a computing server. The application builder platform 130 may include a computing server that takes different forms. In some embodiments, the application builder platform 130 may be a server computer that executes code instructions to perform various processes described herein. In some embodiments, the application builder platform 130 may be a pool of computing devices that may be located at the same geographical location (e.g., a server room) or be distributed geographically (e.g., clouding computing, distributed computing, or in a virtual server network). In some embodiments, the application builder platform 130 may be a collection of servers. The application builder platform 130 may also include one or more virtualization instances such as a container, a virtual machine, a virtual private server, a virtual kernel, or another suitable virtualization instance. Examples of components and functionalities of the application builder platform 130 are discussed in further detail below with reference to FIG. 2A.

A user computing device 140 is a computing device that is possessed by an end user who may be a customer or a subscriber of an application operator 120. An end user may perform transactions, such as purchases, service arrangement, and communications, with the application operator 120 through the application 142 that is operated by the application operator 120 with some features that may be provided or supported by the application builder platform 130. An end user may also receive messages from the message management platform 110 that are related to an application operator 120. For example, the end user may subscribe to messages of an application operator 120 and the message management platform 110 send those messages to the end user on behalf of the application operator 120.

Examples of user computing devices 140 include personal computers (PC), desktop computers, laptop computers, tablets (e.g., iPADs), smartphones, wearable electronic devices such as smartwatches, smart home appliances (e.g., smart home hubs and controllers), vehicle computer systems, or any other suitable electronic devices. In some embodiments, for a message management platform 110 that specializes in SMS messages, user computing devices 140 may be any mobile devices (e.g., phones, tablets) that are equipped with Subscriber Identity Module (SIM) cards, electronic or physical, and/or are associated with phone numbers.

Some of the user computing devices 140 may run one or more applications 142 that are developed by various application operators 120 using the application builder platform 130. For example, the user may download various mobile apps and visit different websites that are operated by various businesses. Each instance of the mobile app and website may be an example of an application 142. Each application 142 may be developed by different creators. For example, in some embodiments, a first application 142 is developed by a first application operator 120 and a second application 142 is developed by a second application operator 120.

Various applications 142 may take different forms. For example, some applications may take the form of webpages that have backend functionalities built using JAVASCRIPT, RUBY ON RAIL, etc. Other applications may be web applications that may appear as SaaS platforms. Yet other applications may be mobile apps that may run on Swift for iOS and other APPLE operating systems or on Java or another suitable language for ANDROID systems. In another case, an application 142 may be a software program that operates on a desktop computer that runs on an operating system such as LINUX, MICROSOFT WINDOWS, MAC OS, or CHROME OS.

An application 142 may incorporate a code snippet 144 that is provided by the message management platform 110 to enable the application 142 to include functionalities provided by the message management platform 110. In some embodiments, the incorporation may be performed through the digital distribution platform provided by the application builder platform 130. An application operator 120 may select the code snippet 144 of the message management platform 110 from a list of applets at the marketplace of the digital distribution platform and the application builder platform 130 in turn provides or causes a server of the message management platform 110 to provide the code snippet 144 as part of the code of the application 142. In some embodiments, the code snippet 144 may also be incorporated at the code level. This may be done by importing one or more libraries of functions and codes of the code snippet 144 to the software code of the application 142 in the header section of the software code and having the code calling one or more functions of the code snippet 144.

While the application operator 120 primarily operates the application 142, the code snippet 144 allows the application 142 to communicate with the message management platform 110. For example, an application operator 120 may be a retail business that develops an application 142 for its customers to purchase items through the application 142. A customer may opt-in to allow the application 142 to track certain analytics, actions, browsing history, and/communications occurred associated with the application 142. The information may be captured by the code snippet 144 and forwarded to the message management platform 110. In another example, the code snippet 144 may be in communication with the message management platform 110 that generates user-tailored information (e.g., personal information, custom promotional messages) to display the information in the application 142, such as in the form of a pop-up, side panel, embedded content, or another suitable way of presentation. In various embodiments, the code snippet 144 may perform any suitable tasks, from front end features, such as providing a control element that is operated by the message management platform 110 on the frontend, to any backend functionalities.

Multiple instances of the code snippet 144 developed by the message management platform 110 may be included in different applications 142. For example, different application operators 120 may be customers of the message management platform 110 and include the code snippet 144 in the applications 142, as illustrated in the user computing device A 140A. Those applications 142 that incorporate the same type of code snippet 144 have included similar functionalities and services provided by the message management platform 110.

Some of the user computing devices 140 may store a cookie 146 that is issued by the message management platform 110. The cookie 146 is used to serve as an identifier so that the message management platform 110 may track a particular user computing device 140 and associate the instance(s) of code snippet 144 that are used in the user computing device 140 with a particular end user or a particular phone number.

The transaction fulfillment operator 150 may be an entity that completes a transaction between an end user and an application operator 120. For example, an end user may make a purchase through the application 142 which is supported by the e-commerce backend provided by the application builder platform 130. After the confirmation of the purchase, the application builder platform 130 (or the application operator 120) may transmit the detail to the transaction fulfillment operator 150 to carry out the transaction, which may include packaging and shipment. The transaction fulfillment operator 150 may provide notifications to the application builder platform 130 regarding various stages of status updates of the purchase, such as the shipment of the parcel, the delivery of the parcel, etc.

The networks 160 provide connections to the components of the system environment 100 through one or more subnetworks, which may include any combination of the local area and/or wide area networks, using both wired and/or wireless communication systems. In some embodiments, the networks 160 use standard communications technologies and/or protocols. For example, a network 160 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 160 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 160 may be represented using any suitable format, such as hypertext markup language (HTML), extensible markup language (XML), JavaScript object notation (JSON), structured query language (SQL). In some embodiments, all or some of the communication links of a network 160 may be encrypted using any suitable technique or techniques such as secure sockets layer (SSL), transport layer security (TLS), virtual private networks (VPNs), Internet Protocol security (IPsec), etc. The networks 160 also include links and packet switching networks such as the Internet.

Example Application Builder Platform Components

Figure 2A:
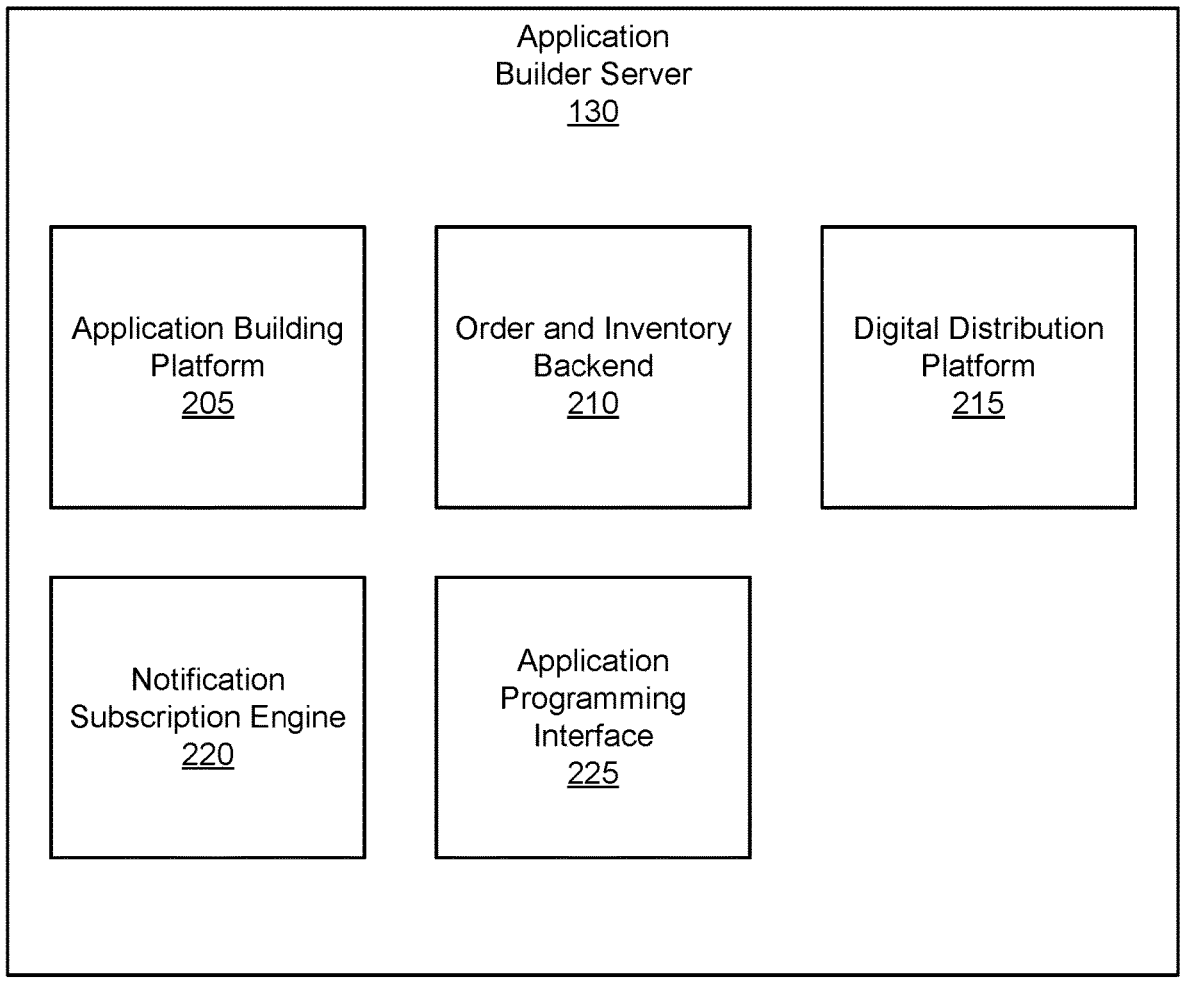
FIG. 2A is a block diagram illustrating various components of an example application builder platform, in accordance with some embodiments.

FIG. 2A is a block diagram illustrating various components of an example application builder platform 130, in accordance with some embodiments. An application builder platform 130 may include an application building platform 205, an order and inventory backend 210, a digital distribution platform 215, a notification subscription engine 220, and an application programming interface 225. In various embodiments, the application builder platform 130 may include fewer or additional components. The application builder platform 130 also may include different components. The functions of various components in application builder platform 130 may be distributed in a different manner than described below. Moreover, while each of the components in FIG. 2A may be described in a singular form, the components may present in plurality.

The application building platform 205 may take the form of a front-end software platform that allows an application operator 120 to design and configure various visual elements and functionalities of an application 142. The building of an application 142 may be based on standard language such as HTML, CSS, JAVASCRIPT, etc. The application builder platform 130 may provide certain pre-built features that allow the application operator 120 to incorporate into the application 142. The pre-built features may include an e-commerce platform, shopping cart features and related order and inventory backend 210, a search engine for the application, payment management, and analytics. As discussed in further detail below, additional features and functionalities may be selected at the digital distribution platform 215 for applets that are provided by other parties.

The order and inventory backend 210 may be a management system that allows the application operator 120 to act as a merchant to sell various goods at the application 142 and manage the inventory of those goods. For each product for a particular merchant, the application builder platform 130 may assign a unique product identifier. In some products that have sub-variants, such as apparel that have sizes and colors, the application builder platform 130 may assign a variant identifier. The order and inventory backend 210 may also allow the application operator 120 to define a taxonomy of products that have categories, levels of sub-categories, and products. The application builder platform 130 may also assign an identifier for each category or sub-category. The application builder platform 130 may include the identifier for a page in the application 142 that is related to the product, variant, category, or subcategory. For example, on the product page of the merchant application 142 that display product detail to the customers, the URL of the page or the HTML of the page may include the product identifier.

The digital distribution platform 215 may take the form of a marketplace, which may be open or semi-open, to various third-party developers to list their software applications that can be incorporated into an application 142 of an application operator 120. An application operator 120 may browse and select various applications on the digital distribution platform 215. For the applications that are selected by the application operator 120, the code of the selected applications is incorporated into the application 142 to expand the functionalities and features of the application 142. For example, the message management platform 110 may publish the code snippet 144 in the digital distribution platform 215 and an application operator 120 may incorporate the code snippet 144 into an application 142.

The notification subscription engine 220 allows an application operator 120 to subscribe to different notification channels that are provided by the application builder platform 130. The notification channels may be divided based on event types, merchants, and other suitable factors. For example, the application builder platform 130 may manage the e-commerce and sales of products on behalf of an application operator 120. The notification channels may include purchase notifications, shipment notifications, delivery notifications, etc. An application operator 120 may select one or more channels to subscribe. In some embodiments, an application operator 120 may authorize the message management platform 110 to subscribe to one or more notification channels on behalf of the application operator 120. The subscription process may include providing a credential of the application operator 120 to the application builder platform 130 through an API call. The API call includes a parameter ("purchase" for purchase events, "shipment" for shipment events) that specifies the notification channel to subscribe. After subscription, the application builder platform 130 provides notifications of a particular type of event to the recipient (the application operator 120 or the message management platform 110).

The application programming interface 225 allows the application builder platform 130 to provide notifications for recipients on subscribed channels. In some embodiments, the notifications can be provided in the form of pull notifications by conventional API in which the recipient (the application operator 120 or the message management platform 110) may continuously poll the API. In some embodiments, the notifications can be provided through webhook, which may be a form of push API notifications where the application builder platform 130 automatically transmit the API notifications to the recipient when a matching event has occurred. An API notification, such as a webhook notification, may include a header and a payload. The payload may be in the format of key-value pairs that are in the format of JSON, XML, YAML, CSV, or another suitable format.

FIG. 2B is a conceptual diagram illustrating an example payload 250 of an API notification, such as a webhook notification, provided by the application builder platform 130, in accordance with some embodiments. The payload 250 may take the form of key-value pairs. The keys and values shown in the payload 250 are for example only. In various embodiments, the payload 250 may include fewer, additional, or different keys. In some embodiments, the pairs may be nested.

The top portion of the example payload 250 may be the first level of key-value pairs and may be referred to as the wrapper 260. The wrapper 260 includes the body 270 of the payload 250 and other high-level information of the payload 250, such as the identifier of the API notification, the identifier of the order related to this notification, the subscription channel 262 of the notification (e.g., "subject type": "Shipment") and other information. The body 270 may be another nested key-value pairs that include additional information contained in the API notification. An example body 270 is separately shown in the lower portion of FIG. 2B.

The body 270 may take the form of another layer of nested key-value pairs that include various information regarding the order, the end user, and other related identification information. In some embodiments, the body 270 may include a key for the identifier 272 of an application 142 and an IP address 274 of the user computing device 140 engaging in the transaction. The application builder platform 130 may also have the information of the end user, which is recorded in the key "customer." The information of the end user may include a unique user identifier 282, the email address 284 of the end user, and the phone number 286 of the end user. The body may further include a key for the order 292 and the value corresponding to the order 292 may include detailed information about the order 292. In some embodiments, the API notification may include an array that lists all of the items 294 in the order 292. The items 294 may be in the format of an array that includes the product or variant identifier of those items in the order 292.

Example Message Management Platform Components

Figure 3:
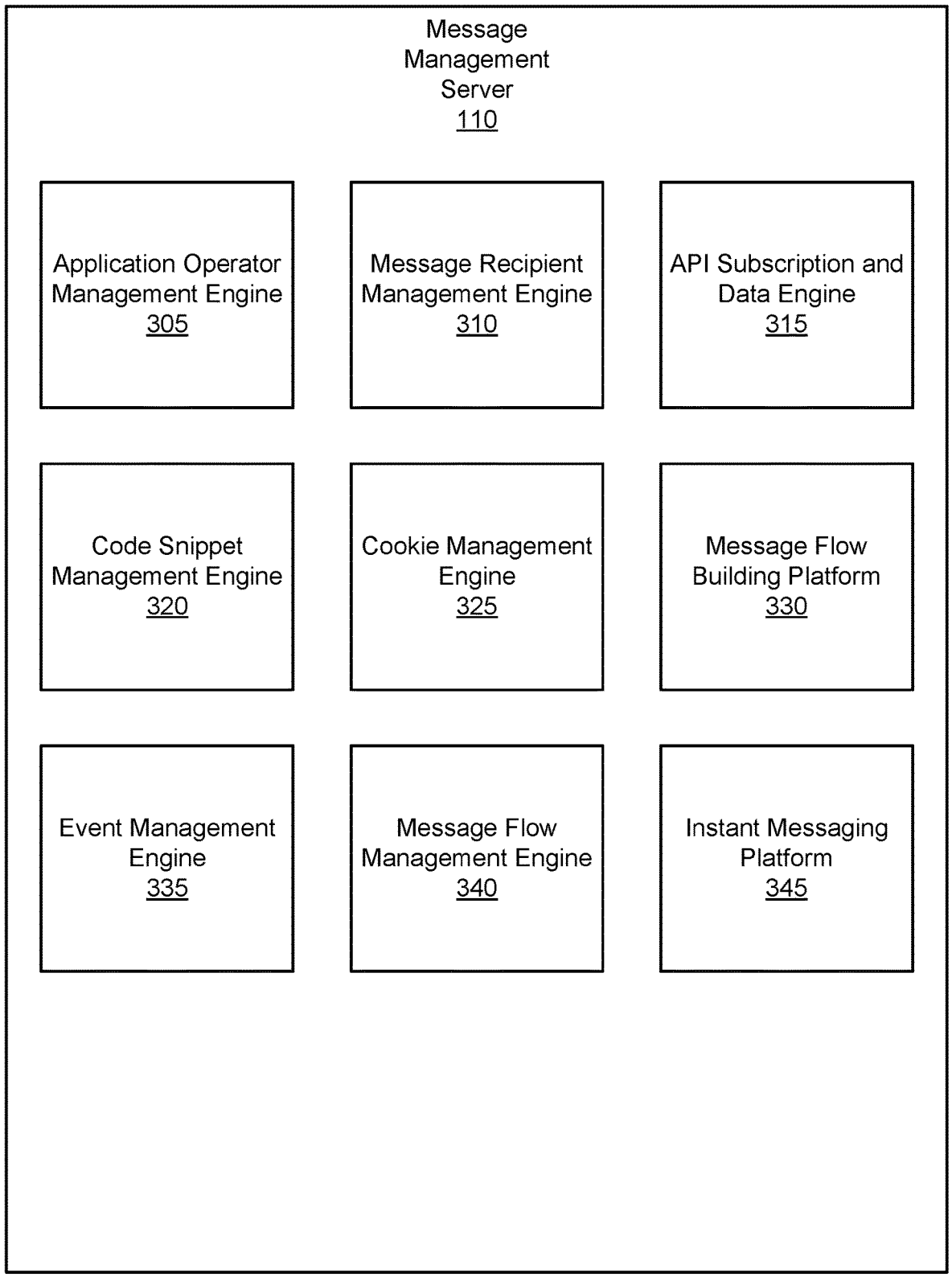
FIG. 3 is a block diagram illustrating various components of an example message management platform, in accordance with some embodiments.

FIG. 3 is a block diagram illustrating various components of an example message management platform 110, in accordance with some embodiments. A message management platform 110 may include the application operator management engine 305, a message recipient management engine 310, an API subscription and data engine 315, a code snippet management engine 320, a cookie management engine 325, a message flow building platform 330, an event management engine 335, a message flow management engine 340, and an instant messaging platform. In various embodiments, the message management platform 110 may include fewer or additional components. The message management platform 110 also may include different components. The functions of various components in message management platform 110 may be distributed in a different manner than described below. Moreover, while each of the components in FIG. 3 may be described in a singular form, the components may present in plurality.

The components of the message management platform 110 may be embodied as software engines that include code (e.g., program code comprised of instructions, machine code, etc.) that is stored on an electronic medium (e.g., memory and/or disk) and executable by a processing system (e.g., one or more processors and/or controllers). The components also could be embodied in hardware, e.g., field-programmable gate arrays (FPGAs) and/or application-specific integrated circuits (ASICs), that may include circuits alone or circuits in combination with firmware and/or software. Each component in FIG. 3 may be a combination of software code instructions and hardware such as one or more processors that execute the code instructions to perform various processes. Each component in FIG. 3 may include all or part of the example structure and configuration of the computing machine described in FIG. 10.

The application operator management engine 305 manages the profiles and credentials of application operators 120 and stores saved message flow templates for retrieval by the application operators 120. For example, an application operator 120 that intends to use the message publisher management engine 305 to launch a message flow to distribute messages to various end users may create an account with the message management platform 110. The message management platform 110 stores the customer's profile, metadata, and credential and associate the information with a unique identifier. The application operator 120 may create message templates, message flow templates, specify criteria of message distribution, and goals of message flows, select or specify types of events and analytics to be captured by the message management platform 110, manage subscription plans, and configure other settings with the message management platform 110. The templates and settings are associated with the customer identifier and can be retrieved, duplicated, edited, and deleted based on the application operator's preferences and actions entered through the message flow building platform 330 and/or API provided by the message management platform 110.

In some embodiments, the message publisher management engine 305 may also store credentials or access keys of application operators 120. The application operator 120 may provide the message management platform 110 an access key, such as an API access key with a particular level of access privilege, for the message management platform 110 to subscribe to various notification channels provided by the application builder platform 130.

The message recipient management engine 310 manages the profile of end users that receive messages from the message management platform 110. An application operator 120 may specify the intended audience based on the users' segmentation and tags that categorize the users. The message management platform 110 may associate end users based on the user computing devices 140 and/or phone numbers. An end user or the corresponding user computing device 140 may be assigned a subscriber identifier. Depending on whether a user computing device 140 is determined as possessing an application 142, a code snippet 144, and/or a cookie 146, the message recipient management engine 310 may also associate the subscriber identifier with one or more of the following: phone number, email address, device identifier, application identifier, and/or cookie identifier.

The message recipient management engine 310 may maintain tags for end users for one or more purposes such as audience segmentation. The tags may take the form of metadata tags. The tags may include information such as preferences of the user computing devices 140, opt-in or opt-out options of the user computing devices 140 (e.g., subscribed or not), and other characteristics of the message recipients, including consented information such as gender, age, interested products, interested news, etc. Based on the tags, the message recipient management engine 310 may categorize the end users into one or more groups. The message recipient management engine 310 may also store the entire records of messages and chat history of each user computing device 140, such as metadata of the messages (e.g., date and time of the messages). The message recipient management engine 310 may also store the purchases and other actions taken by the end users.

The API subscription and data engine 315 subscribes to various API notification channels (e.g., webhook channels) provided by the application builder platform 130 on behalf of application operators 120. For example, an application operator 120 authorizes the message management platform 110 to receive data form the application builder platform 130 for relevant information related to the e-commerce service of the application operator 120. In some embodiments, the API subscription and data engine 315 receives payloads 250 from the application builder platform 130 webhook.

The API subscription and data engine 315 in turn may identify the nature of each payload 250 by reviewing the notification channel type 262. Discussing FIG. 3 in conjunction with FIG. 2B, the API subscription and data engine 315 may also identify the user computing device 140 based on the application identifier 272 and device IP address 274. In some embodiments, the API subscription and data engine 315 may have a mapping of subscriber identifiers stored by message recipient management engine 310 and the user identifiers 282 used by the application builder platform 130. In such a case, the API subscription and data engine 315 may be able to immediately determine the user who is specified in payload 250. In some cases, if a particular user identifier 282 is not available in the system of message management platform 110, the API subscription and data engine 315 may inspect the email 284 and the phone number 286 to determine the user who is specified in the payload 250. The API subscription and data engine 315 may review various values in the payload 250 and in turn associate the data to user, product, and/or event records that are maintained by the message management platform 110 on behalf of one or more application operators 120.

The code snippet management engine 320 manages the code snippets 144 and receives data from the code snippets 144. In some embodiments, a version of the code snippet 144 may be a background applet that tracks users' actions in the e-commerce system provided in the application 142. For example, each product or category page of the e-commerce system may be associated with a product, variant, and/or category identifier assigned by application builder platform 130 as discussed in the order and inventory backend 210 in FIG. 2A. Those identifiers may be generally referred to as item identifiers. For an item page in the application 142, the item identifier corresponding to the item may be included in the HTML code or the URL of the item page. The code snippet 144 may parse the item identifier as the end user visits a page and transmit the item identifier to the code snippet management engine 320. As such, the code snippet 144 may be used to track various user actions including viewing a product page, adding an item to a shopping cart, beginning to check out, completing a transaction, etc. Based on preapproval by the end user, the code snippet 144 may transmit the information of the user action to the code snippet management engine 320.

Additionally, or alternatively, in some embodiments, the code snippet 144 may maintain one or more active user interface elements intended for display in the application 142, such as in the form of a popup. The code snippet 144 may receive a message from the message management platform 110 including configuration data for the message. The code snippet 144 may cause the application 142 to display the message. This may be used for in-app promotional content and personal content for the application 142.

The cookie management engine 325 installs and manages various cookies 146 in user computing devices 140. A cookie 146 may be installed on a user computing device 140 through an approval process. The approval process may vary depending on embodiments and situations. For example, the approval may take the form of an end user affirmatively selection subscription of contents from the application operator 120, via clicking a message or responding to a text message such as an SMS message. In another case, the approval may take the form of an end user authorizing the use of cookies. In some embodiments, when a user opens an application 142 that has the code snippet 144 installed, the code snippet 144 communicates to the message management platform 110 to see if there is a cookie already installed at the user computing device 140. If not, the code snippet management engine 320 may generate a random string that can be incorporated as part of the cookie 146 and send the random string to the user computing device 140. In turn, the user approves the cookie 146 and the cookie is generated and stored in the user computing device 140. The random string may be used as an identifier or a part of the identifier for a user computing device 140. In communicating with the message management platform 110, code snippet 144 may refer to one or more identifiers of the cookie 146 as an identification source for a particular user computing device 140.

The message flow building platform 330 may take the form of a front-end software application interface for application operators 120 to design and manage various messages, message flows, audience selection criteria, and message trigger conditions. Each message flow may be referred to as a message series, which includes a series of related messages that are sent to a user computing device 140 when a certain condition is met. The messages in a message flow may be linked together in any suitable ways, branched or linear, cyclic or acyclic. The triggers may be based on time, audience, events, and other suitable conditions. Examples features, functionalities, and graphical user interface elements of the message flow building platform 330 for configuring a message flow are shown in FIG. 6 through FIG. 8F.

The event management engine 335 manages and stores events associated with the users, user computing devices 140, and applications 142. The events may be transmitted directly from the user computing devices 140, the application operators 120, the code snippets 144 that are installed in user computing device 140, and API notifications, such as webhook notifications, of the application builder platform 130.

Events transmitted from the application operators 120 or third parties may trigger the transmission of one or more messages by the message management platform 110 to one or more user computing devices 140. By way of example, the message management platform 110 may receive an API notification from the application builder platform 130 that includes a customer identifier 282 in the payload 250. The event management engine 335 may match the customer identifier 282 of the application builder platform 130 to the subscriber identifier 310 to determine the end user or a particular user computing device 140 that is related to the event described in the API notification. The event management engine 335 determines the message flows that the particular user computing device 140 is currently being enrolled in and determines if the event meets any of the trigger conditions specified by the application operator 120. In response to matching the event to a trigger condition, the message management platform 110 sends a message specified in the message flow to the particular user computing device 140.

An event notification may also be transmitted from a code snippet 144 of an application 142. For example, the code snippet 144 may track the actions of the end user in browsing or purchasing on an e-commerce application 142. The code snippet 144 may transmit notifications to the message management platform 110 describing the actions taken by the user and the products that are associated with the actions. The event management engine 335 stores the events and also determines if an event matches a trigger condition in a message flow specified by the application operator 120.

Events managed by the event management engine 335 may be of any suitable nature. In some cases, the events may be related to actions taken by an end user in using an application 142. For example, the actions can be visiting a product page, subscribing to certain types of information, beginning to check out, completing a checkout, canceling a transaction, etc. The events may also be related to actions taken by a transaction fulfillment operator 150 such as completing an order, placing an order for shipment, delivery of an item, etc. Events may also be related to public events, general events, or events associated with the business of the application operator 120. For example, the events may be a flight delay, a weather issue, or a change in the business of the application operator 120. Events may further be related to the usage of an application 142 such as opening the application, closing the application, and uninstalling the application. Events may further be related to responses provided by the end user such as SMS messages sent from the user.

The message flow management engine 340 manages the message series that are designed and saved by various application operators 120. The message flow management engine 340 may cause a server to transmit various messages to different user computing devices 140 based on different conditions. A message flow may be associated with a start condition, an end condition, message recipient selection criteria, a message order, message branching, and trigger conditions and channels of communication.

A start condition may include various rules that specify when a message series will be triggered for a particular candidate user computing device 140. A trigger condition may be an event, such as a user event that is received via an API notification from the application builder platform 130 indicating the user has performed an action. For example, a message series may be triggered when a user completed a purchase. The start condition may also be manually started by an application operator 120 without a trigger condition. For example, the application operator 120 may manually select assign a message flow to an end user. This may occur anytime such as when the application operator 120 is in a chat session with the end user via the instant messaging platform 345. In some embodiments, the start condition may also be met through audience segment criteria.

A trigger condition may also be a condition that causes the message flow management engine 340 to send a message in the message flow. For example, a message series may begin N hours after a user has created an account with the application operator 120. Other trigger conditions may include tag change, location matching, location attributes, an event occurring, etc. In some cases, the message series starts immediately after a trigger condition is met. In other cases, the message series is scheduled based on the timing and date.

The start condition or trigger conditions may also include certain limitations. For example, the limitation may prevent the message management platform 110 from involving a user computing device 140 in more than a certain number of message flows within a predetermined period of time. The limitation may also prevent the message management platform 110 from involving a user computing device 140 in a repeated message journey An end condition may include various rules that specify when a message series is completed. An application operator 120 may specify that a message series is completed after all messages in the series are sent. Other end condition examples may specify rules for a message series to end prematurely. For example, a message series may end on a conversion event or an event transmitted via the API notification from the application builder platform 130. A conversion event is associated with a conversion condition. The message management platform 110 may exit a user computing device 140 when the conversion event is detected. For example, in a marketing campaign, when a user computing device 140 makes a purchase, the application operator 120 may specify that the marketing campaign should be ended. A cancellation event may be an event that is indicated by the user computing device 140 or the application operator 120 to stop the message series. For example, a user computing device 140 may want to opt-out or unsubscribe from the message series.

The message order and message branching allow an application operator 120 to select how the messages in a series are arranged. A message series can be linear or can be branched. The application operator 120 may also specify conditions to skip one or more messages.

The selection of messages in a message flow may further depend on the recipient's response or a lack of response. For example, the message flow may be distributed via SMS which allows the user to respond. The message management platform 110 may determine that the recipient did not provide a response to messages and select a message branch based on this condition. In another example, the user may provide a response via SMS. Based on the type of response and the goal specified by the application operator 120 when designing the message flow, the message management platform 110 may select a different subsequent message to be sent to the recipient 140.

The instant messaging platform 345 may be a front-end software platform that allows agents of message management platform 110 or an application operator 120 to communicate with users in real-time. For example, a user may be enrolled in a message flow and has received one or more messages via SMS. The user may decide to provide a response to one of the messages. In some embodiments, the instant messaging platform 345 may transition the user to an instant messaging mode in which an agent is assigned to communicate with the user. In some embodiments, a message flow may be triggered through an instant conversation between an agent and a user. The agent may enroll the user in a message flow through the instant messaging platform 345.

Example Event Trigger Message Process

Figure 4A:
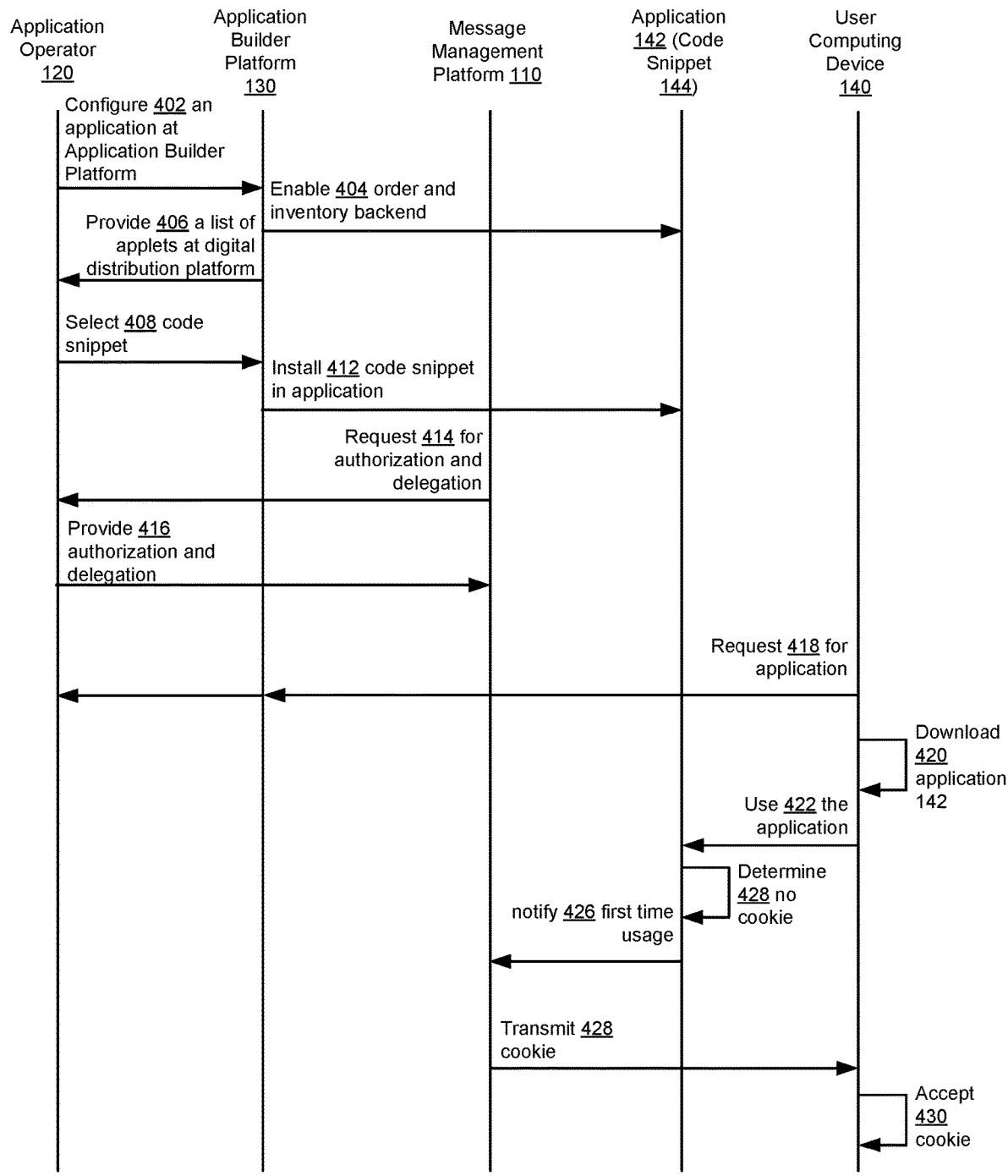
FIGS. 4A and 4B are sequence diagrams illustrating an example series of interactions among entities of the system environment to deliver messages to users based on event trigger, in accordance with some embodiments.
Figure 4B:
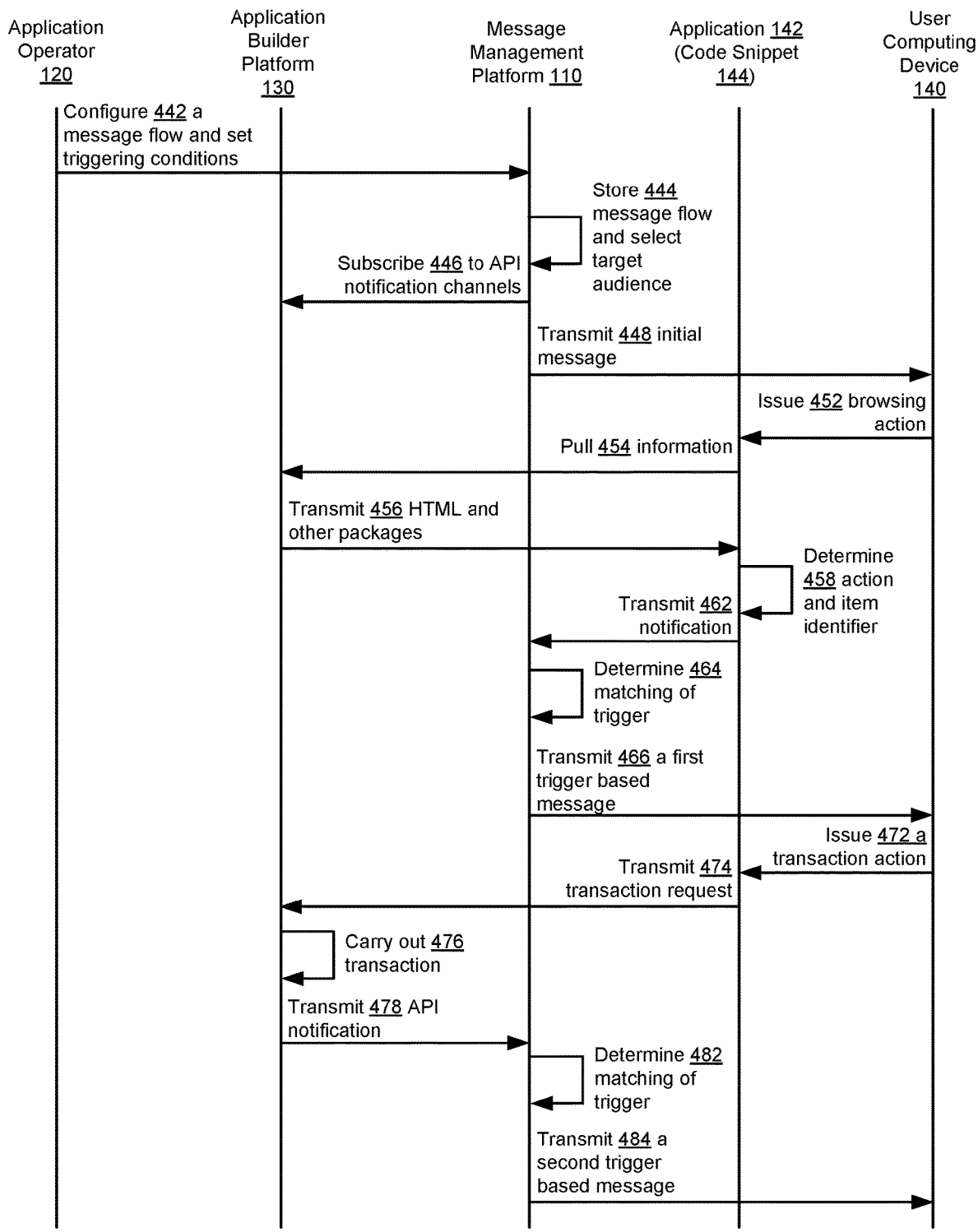

FIGS. 4A and 4B are sequence diagrams illustrating an example series 400 of interactions among entities of the system environment 100 to deliver messages to users based on event trigger, in accordance with some embodiments. The series 400 illustrated in FIGS. 4A and 4B represents specific sets of instructions that may be stored in one or more computer-readable media, such as memory of different servers. The instructions, when executed by one or more processors of the depicted entities, cause one or more processors to perform the described interactions. As depicted in FIGS. 4A and 4B, the series 400 is performed by an application operator 120, the application builder platform 130, the message management platform 110, the application 142 that has incorporated the code snippet 144, and a user computing device 140. The sequence of interactions 400 depicted in FIGS. 4A and 4B is merely an example of sequence of interactions, and in other embodiments the sequence of interactions may include fewer, additional, or different actions performed by the same or different entities. While the steps in series 400 are illustrated graphically in FIGS. 4A and 4B as sequences of steps, some of the steps may occur in different sequences than illustrated or may occur concurrently with other steps. Also, while series 400 is depicted as a single series, in various embodiments and situations the series 400 may be further broken down into multiple series 400. For example, the series depicted in FIG. 4A and the series depicted in FIG. 4B may be two independent series.

In the series 400, an application operator 120 may configure 402 an application 142 at the application builder platform 130, such as using the application building platform 205. The design and configuration of the application 142 may include writing backend code using language such as JAVASCRIPT, RUBY ON RAIL, PYTHON, etc., designing front-end elements and pages using HTML and CSS, and incorporating standard features provided by the application builder platform 130 such as the e-commerce functionality and order and inventory backend. The application builder platform 130 may enable 404 the order and inventory backend 210 for the application 142 published by the application operator 120.

The application operator 120 may incorporate additional features to the application 142. For example, the application builder platform 130 may provide 406 a list of applets at the digital distribution platform 215 for the application operator 120 to select and add. In some embodiments, the application operator 120 may select 408 the code snippet 144 published by the message management platform 110. In response, the application builder platform 130 may install 412 the code snippet 144 in the application 142 by incorporating the code of the code snippet 144 into the code of the application 142.

By selecting the code snippet 144 at the digital distribution platform 215, the message management platform 110 may request 414 the application operator 120 to provide authorization and delegation on certain features and privileges that are possessed by the application operator 120. For example, the application operator 120 may provide 416 authorization to allow code snippet 144 to track user actions on the application 142 and provide 416 delegation for the distribution of messages to end users to the message management platform 110. The application operator 120 may also provide authorization and credentials to the message management platform 110 for the message management platform 110 to subscribe to one or more API notification channels provided by the application builder platform 130.

An end user, through his/her user computing device 140, may request 418 for the application 142. The request may take different forms and may be directed to the application operator 120 and/or the application builder platform 130. For example, if the application 142 takes the form of a website, the request may simply be downloading the website. The download request may be directed to the application operator 120 or the application builder platform 130, depending on which party hosts the website. In some embodiments, the application 142 may take the form of a mobile app. In such a case, the request may be an installation request through an app store. Regardless of the form of the application 142, the user computing device 140 may download 420 the application 142.

Upon the user's usage 422 of the application 142, the code snippet 144 may determine 428 that there is no cookie issued by the message management platform 110 stored in the user computing device 140. In turn, the code snippet 144 may notify 426 the message management platform 110 that the application 142 is in the first time use of the user computing device 140. The message management platform 110 may generate a random string that may serve as the subscriber identifier or part of the subscriber identifier used in the cookie. The message management platform 110 may transmit 428 the cookie to the user computing device 140. The user, who controls the user computing device 140, may choose to accept 430 the cookie. The series 400 depicted in FIG. 4A is completed and message management platform 110 may now be authorized to track the user's actions using the code snippet 144.

Referring now to FIG. 4B, the application operator 120 may configure 442 a message flow that includes a series of messages, whether the message flow is branched or linear, cyclic or acyclic, individually targeted or campaign based that targets more than one users. The application operator 120 may also set trigger conditions for sending one or more messages. For example, some of the trigger conditions may be event-based. The message management platform 110 in turn may store 444 the message flow and select the target audience.

Meanwhile, the message management platform 110 may subscribe 446 to one or more API notification channels of the application builder platform 130 on behalf of the application operator 120. The subscription step 446 may occur anytime after the application operator 120 provides authorization in step 416.

The message management platform 110 may determine that a particular user who is associated with one of the user computing devices 140 is an intended audience of the message flow. The transmission of a message may be triggered based on various conditions and the series 400 provides some non-limiting examples. In some embodiments, the message management platform 110 may transmit 448 an initial message to the user computing device 140 upon determining the user is an intended audience. In some cases, a message may be triggered from a notification of the code snippet 144. In other cases, a message may be triggered from an API notification sent from the application builder platform 130. Other message triggers may include time triggers, other action triggers, automatic triggers, or any suitable triggers. Those other triggers are not illustrated in FIG. 4B.

One of the triggers may be based on a notification from the code snippet 144. By way of example, the user computing device 140 may issue 452 a browsing action. In turn, the application 142 may pull 454 information from the application builder platform 130 that hosts the pages of the application 142. The application builder platform 130 may transmit 456 HMTL files and other packages to the application 142 for the application 142 to display a page. The page may be an item page. The application builder platform 130 may include an item identifier in the URL of the item page or inside the HTML file. The code snippet 144 may determine 458 the nature of the action of the end user and the item identifier associated with the item page. For example, the nature of the action may be simply browsing, bookmarking an item, adding an item to the cart, etc. The code snippet 144 may transmit 462 a notification to the message management platform 110 that includes the nature of the action, metadata related to the action (e.g., time duration of browsing), and the item identifier. Based on the received information, the message management platform 110 may determine 464 that the nature of the action matches a trigger condition in the message flow for sending one of the messages. In turn, the message management platform 110 may transmit 466 a first trigger-based message to the user computing device 140.

Another example trigger may be based on an API notification from the application builder platform 130. The user computing device 140 may issue a transaction action to the application 142. For example, the transaction action may be purchasing an item, requesting a shipment, etc. The application 142 may use the order and inventory backend 210 provided by the application builder platform 130 in fulfilling any purchase request. The application 142 may transmit 474 the transaction request to the application builder platform 130. The application builder platform 130 may in turn carry out 476 the transaction such as by completing the order, initiating a shipment, etc. Based on the nature of the actions performed by the application builder platform 130, the application builder platform 130 may transmit 478 one or more API notifications to the message management platform 110, which has subscribed to the API notification channels. The message management platform 110 may use the API subscription and data engine 315 and the event management engine 335 to parse the data in an API notification. In turn, the message management platform 110 may determine 482 that the nature of the action recorded in the API notification may match one of the trigger conditions. The message management platform 110 may transmit a second trigger-based message to the user computing device 140.

While step 472 through step 484 are illustrated as subsequent steps of the step 452 through step 466, an API notification-based trigger may occur before or concurrently with a code snippet-based trigger. Also, the initial message may also be triggered based on a code snippet notification or an API notification.

While the series 400 illustrates that the triggers are used to cause the message management platform 110 to transmit a message, in some situations a trigger may also cause the message management platform 110 to stop sending messages to a user computing device 140 or to terminate a message flow. Those triggers may also be based on time, code snippet notification, API notification, etc. The series of terminating a message flow based on a trigger is similar to the series 400 except the transmission 484 is changed to a termination step. Detail of the series for terminating a message flow is not further illustrated.

Example Message Transmission Process

Figure 5:
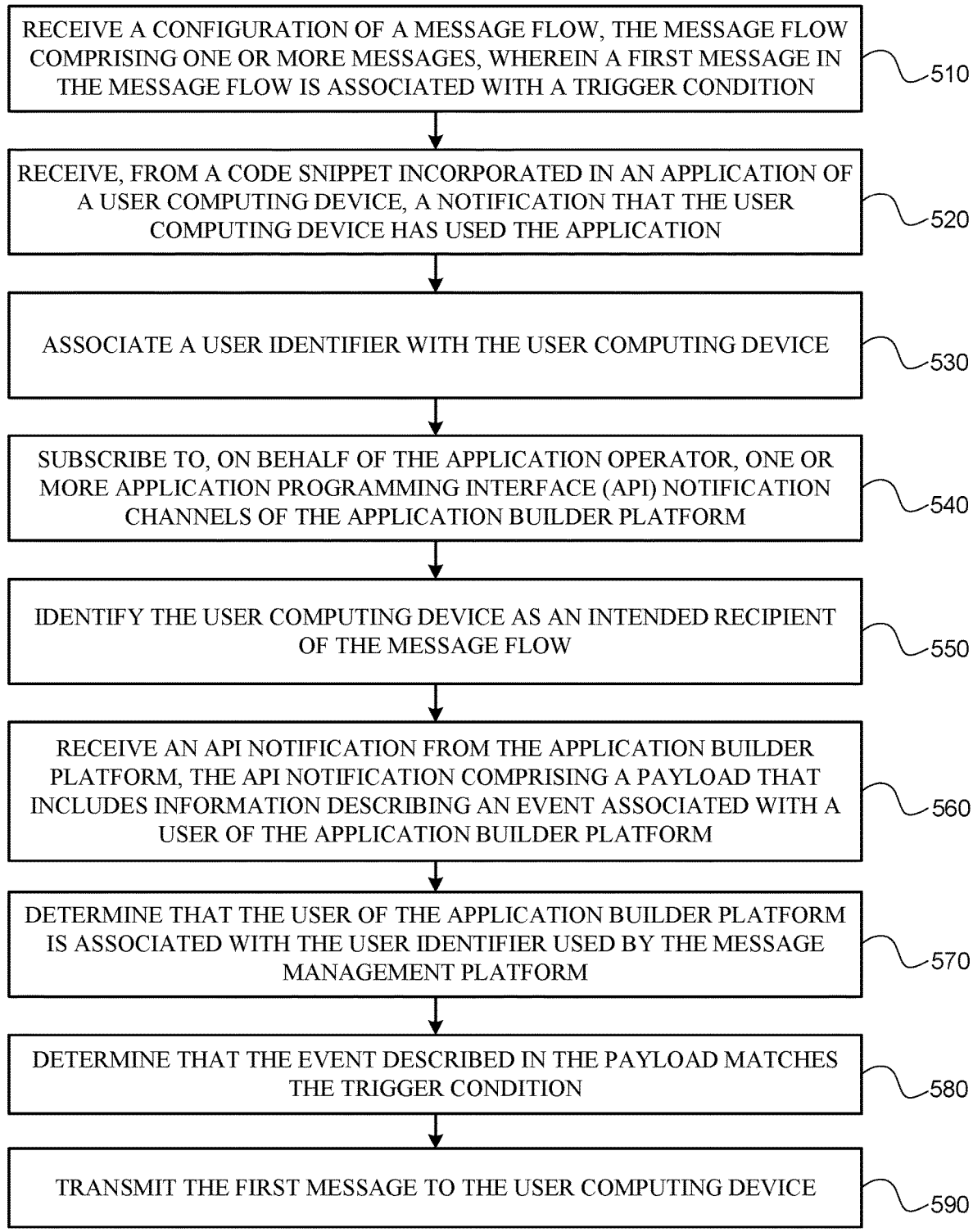
FIG. 5 is a flowchart depicting an example process for transmitting, in accordance with some embodiments.

FIG. 5 is a flowchart depicting an example process 500 for transmitting one or more trigger-based messages, in accordance with some embodiments. The process 500 may be performed by one or more servers of the message management platform 110. The process 500 may be embodied as a software algorithm that may be stored as computer instructions that are executable by one or more processors. The instructions, when executed by the processors, cause the processors to perform various steps in the process 500. In various embodiments, the process 500 may include additional, fewer, or different steps.

In some embodiments, the message management platform 110 may receive 510, from an application operator 120, a configuration of a message flow. The message flow includes one or more messages. For example, a first message in the message flow may associated with a trigger condition. The graphical user interface (GUI) is part of a message flow builder that allows the application operator to build the message flow. Examples of GUI are illustrated in FIG. 8A through 8F.

In this disclosure and claims, the phrases "first message" and "second message" are merely identifiers to distinguish two different messages. The use of "first," "second," "third," does not imply that the "first message" has to be the start message of the entire message flow or that "first," "second," "third" have an order, sequence, or consecutiveness. For example, the second message may be a preceding messaging than the first message and there can be multiple messages between the first and second messages.

In some embodiments, the message management platform 110 may receive 520, from a code snippet 144 incorporated in an application 142 of a user computing device 140, a notification that the user computing device 140 has used the application 142. For example, this might be the first the user visits a website or open a mobile application. In some embodiments, the application 142 may be controlled by the application operator 120 and has a backend component that is operated by an application builder platform 130. The code snippet 144 is listed in a digital distribution platform 215 the application builder platform 130. The code snippet 144 may check if a cookie 146 of the message management platform 110 exists in the user computing device 140. If not, the code snippet 144 may notify the message management platform 110 to generate a cookie 146. For example, the message management platform 110 may generate, responsive to receiving, from the code snippet, the notification that the user computing device has used the application, a random string that is used as at least a part of the user identifier. The message management platform 110 may generate a cookie 146 based on a random string. The message management platform 110 may transmit the cookie 146 to the user computing device 140. The user computing device 140 may store the cookie 146 that is used by the message management platform 110 to track the user computing device 140. In some embodiments, the message management platform 110 may associate 530 a user identifier with the user computing device. The user identifier may be based on the random string of the cookie 146.

In some embodiments, the message management platform 110 may subscribe to 540, on behalf of the application operator 120, one or more API notification channels of the application builder platform 130. Event natures corresponding to the one or more API notification channels are selectable in the graphical user interface as candidate trigger conditions. For example, the API notification channels that are available to subscribe may be put in a list at the message flow building platform 330 as selectable candidate trigger conditions.

In some embodiments, the message management platform 110 may identify 550 the user computing device 140 as an intended recipient of the message flow. The identification may be based on user specific actions, user browsing history, and/or user tags that are discussed in further detail in FIG. 6 through FIG. 8F. For example, the message flow may be a series of automated messages that are to be sent to provide information on an order after a user completes an order. The user computing device 140 may be selected based on the user completing an order. In another situation, the message flow may be a message campaign that is to be distributed to a number of end user subscribers. The user computing device 140 may be selected based on user tags that identify characteristics of the users.

In some embodiments, the message management platform 110 may receive 560 an API notification from the application builder platform 130. The API notification may include a payload 250 that includes information describing an event associated with a user of the application builder platform 130. The API notification is a webhook notification. The payload comprises a plurality of key-value pairs, the plurality of key-value pairs comprise a second user identifier used by the application builder platform 130 and a phone number of the user of the application builder platform 130. The event associated with the user of the application builder platform 130 may be related to a transaction performed at the backend component that is operated by the application builder platform 130. For example, the backend component may be the order and inventory backend 210 or other examples that are discussed in this disclosures.

In some embodiments, the message management platform 110 may determine 570 that the user of the application builder platform 130 is associated with the user identifier used by the message management platform. For example, the payload 250 has a customer identifier 282, email address 284, or phone number 286 that can be matched to the database maintained by the message management platform 110 to establish the association.

In some embodiments, the message management platform 110 may determine 580 that the event described in the payload matches the trigger condition. For example, the payload 250 may include subject type 262 and/or order information 292 that may be used by the message management platform 110 to determine the nature of the user action performed. After the nature is determined, the message management platform 110 may determine whether the nature match a trigger condition in the message flow. In some embodiments, the message management platform 110 may transmit 590 the first message to the user computing device.

In some embodiments, the message management platform 110 may receive a second notification from the code snippet related to a browsing event of the user computing device, wherein the code snippet has determined an item identifier from a webpage associated with the browsing event. The message management platform 110 may determine that the browsing event meets a second trigger condition associated with a second message in the message flow. The message management platform 110 may transmit the second message to the user computing device.

Example Flow Plan Hierarchy

Figure 6:
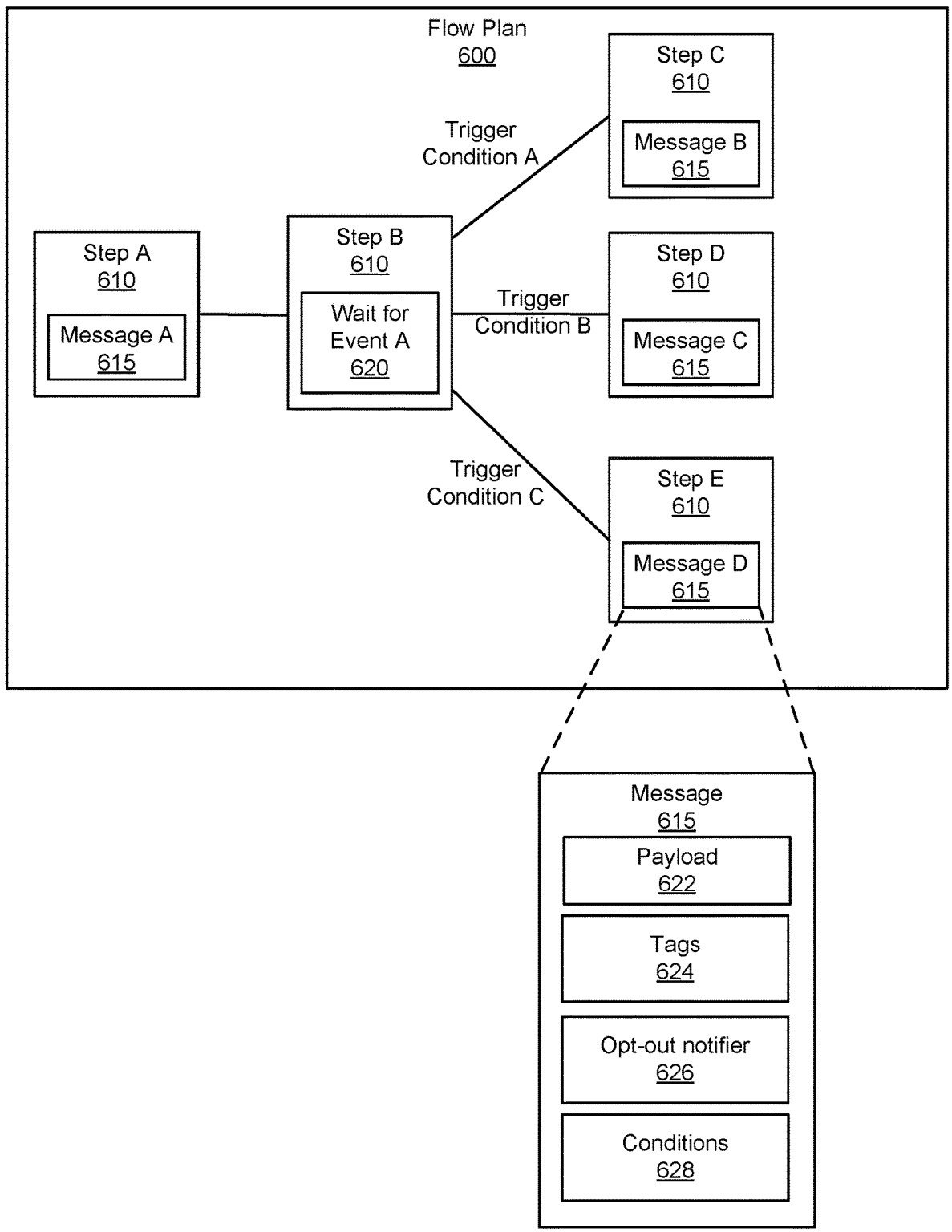
FIG. 6 is a block diagram illustrating an example flow plan hierarchy that may be used with the message management platform, in accordance with some embodiments.

FIG. 6 is a block diagram illustrating an example flow plan hierarchy that may be used with the message management platform 110, in accordance with some embodiments. The message flow plan 600 may include steps 610 that are connected to each other to define one or more message series or branches. Steps 610 may correspond to different types of actions. For example, the step 610 may be sending a message 615. As another example, the step 610 may be waiting for an event 620 to occur. As yet another example, the step 610 may be a delay step to introduce a delay of a predetermined amount of time prior to proceeding with the flow. As yet another example, the step 610 may be a split step to split the group of end users of the message flow plan 600 into two or more groups for performing statistical analysis or testing (e.g., AB testing). The order of steps 610 shown in FIG. 6 is not intended to be limiting and is for illustration only. In the example shown in FIG. 6, the message flow plan 600 defines three different message series, where the first step in each series is sending of a message, the second step in each series is a branching step based on the detail of an event, and the third step is sending off a respective message for the corresponding series. The message flow plan 600 may also be referred to as a message campaign or message automation.

The steps 610 in the message flow plan 600 may be connected in any suitable way, branched or linear, cyclic or acyclic. The transmission of an initial message (e.g., Message A) under the message flow plan 600 may be based on an associated trigger condition (e.g., target recipient criteria; publisher-configured trigger) that specifies the group of message end users to the application operator 120 that may receive messages under the message flow plan 600.

The message flow plan 600 may also set exclusion trigger conditions based on which one or more end users may be temporarily excluded or permanently removed from the group of end users and thereby prevented from receiving messages 615 under the message flow plan 600. The exclusion trigger condition may be associated with a goal of the message flow plan 600. For example, the goal of sending a series of messages to an end user under a message campaign may be to induce the end user to perform a certain action (e.g., make a purchase). The message management platform 110 may receive an event trigger from the application operator 120 when the event corresponding to the exclusion trigger condition has occurred for a given end user in the group, and the message management platform 110 may remove the given end user based on the occurrence of the exclusion trigger condition.

Subsequent messages (e.g., Messages B-D) sent under the message flow plan 600 may have corresponding trigger conditions (e.g., Trigger Conditions A-C) based on the satisfaction of which the end user of the group may receive the corresponding message. The Trigger Conditions A-C may be event-based triggers or publisher-configured triggers. In the example shown in FIG. 6, the message flow plan 600 includes step B which is a branching step that splits end users into different branches based on details of an event (e.g., message trigger condition).

The application operator 120 may arrange the order and branching of steps 610 of the different series and compose each message 615. The application operator 120 may use the flow designer to design the payload 622, the tags 624, the opt-out notifier 626, and the conditions 628 (e.g., target recipient criteria, message trigger conditions) for triggering each message 615. The message payload 622 may include text, image content, and multimedia content such as voice, videos, and music. The tags 624 may include dynamic data (e.g., end user name) that is populated during the generation and transmission of the message 615 to a specific end user based on event payload data or end user data. The application operator 120 may also include the opt-out notifier 626 in the message 615 which may be acted upon by the end user to opt-out of or unsubscribe from receiving messages 615 from the message flow plan 600 or from the application operator. The application operator 120 may also specify the conditions 628 (e.g., message trigger conditions, target recipient criteria) for triggering a message 615 to be sent. The conditions 628 may specify that the corresponding message 615 is sent automatically or after a time delay. For example, the conditions 628 for Message A 615 may include the target recipient criteria that specify which message end users of the application operator 120 may receive the message 615. As another example, the conditions 628 for Message C may include the trigger condition B which, when met by a specific end user, causes the transmission of the message C to that end user.

Example Flow Plan Composition Process and GUI

Figure 7:
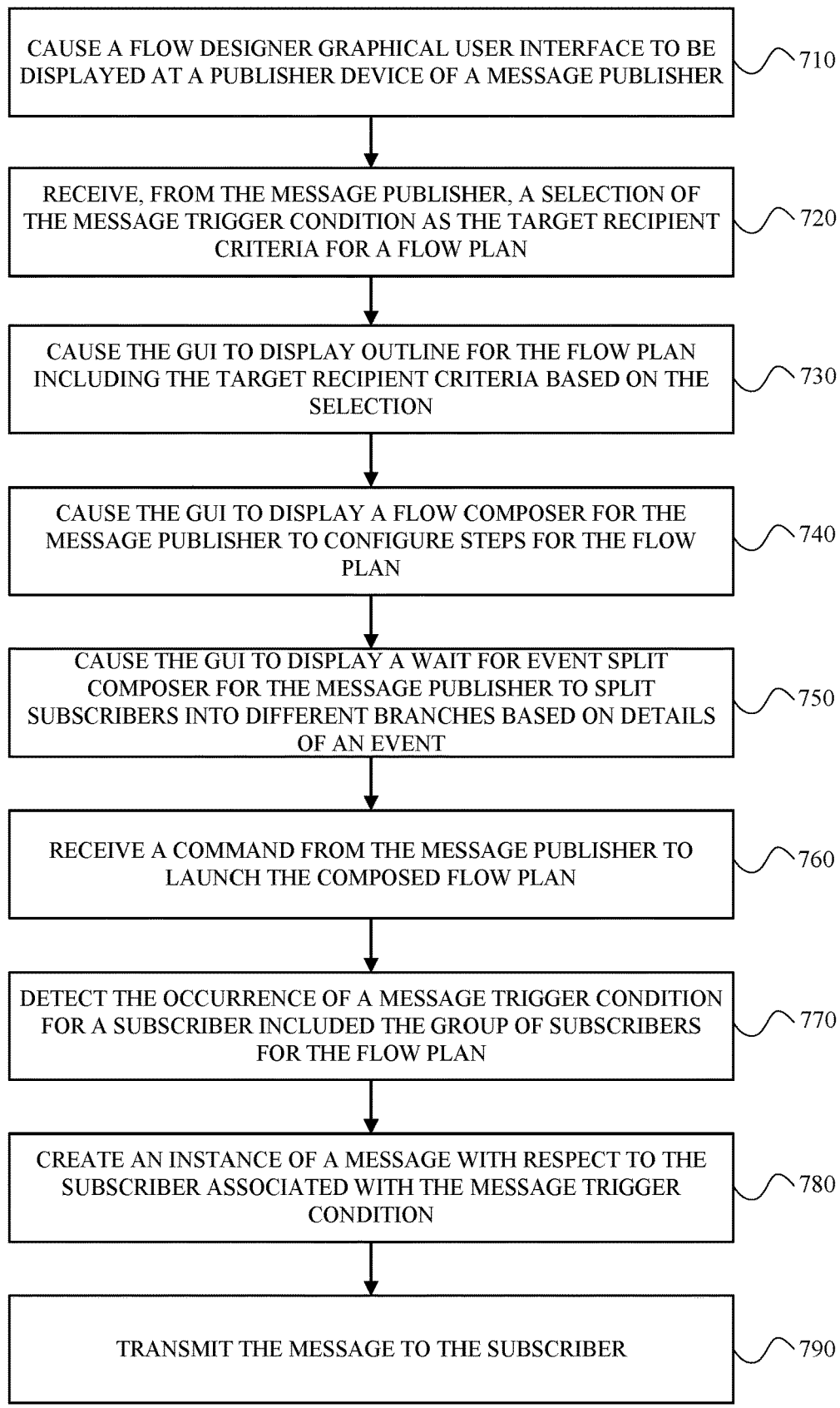
FIG. 7 is a flowchart depicting an example process for a message management platform to provide an interface for an application operator to compose and launch a flow plan, in accordance with some embodiments.

FIG. 7 is a flowchart depicting an example process 700 for a message management platform 110 to provide an interface, e.g., message flow building platform 330, for an application operator 120 to compose and launch a flow plan 600, in accordance with some embodiments. FIG. 8A through FIG. 8E are example illustrations of graphical user interfaces provided by a message management platform 110 for an application operator 120 to compose a flow plan 600, in accordance with some embodiments. FIG. 9 is an example of a webpage 900 associated with an application operator 120 where end user activity may cause the message management platform 110 to detect a message trigger condition associated with a flow plan 600, in accordance with some embodiments. FIG. 7 is discussed in conjunction with FIG. 8A through FIG. 8E and FIG. 9.

The message management platform 110 may cause 710 a flow designer GUI to be displayed at a publisher device of an application operator. The GUI may include a plurality of control elements for the application operator 120 to build and launch a flow plan 600. For example, the GUI may include a flow plan builder that may allow the application operator 120 to drag and drop flow actions and configure instances of the actions using action composers. The flow actions may be of different types and can be dragged and dropped into a flow outline to compose a sequence of the steps 610 of the message flow plan 600.

The message flow plan 600 may be defined by a series of rules and logic for the message management platform 110 to automatically transmit one or more messages to a plurality of target end users (target message recipients) on behalf of the application operator 120 when certain trigger conditions are met. In one embodiment, the GUI may take a form of a web browser application. In another embodiment, the GUI may take the form of a software application (e.g., a mobile application) published by the message management platform 110 and installed on a publisher device of the application operator 120 to configure the message flow plan.

The application operator 120 may build a flow plan 600 that specifies the different steps or actions for different series of messages to be automatically transmitted by the message management platform 110 in a period of time in response to corresponding conditions being met. The message management platform 110 may operate or be in communication with a GUI for the application operator 120 to build the message flow plan 600. The GUI may include a landing page, which allows the application operator 120 to input a selection to build a new flow plan 600. In response, the GUI may display a plurality of control elements (e.g., target recipient criteria, actions, action composers) that may be configured to allow the application operator 120 to build the message flow plan 600 step 610 by step 610.

Figure 8A:
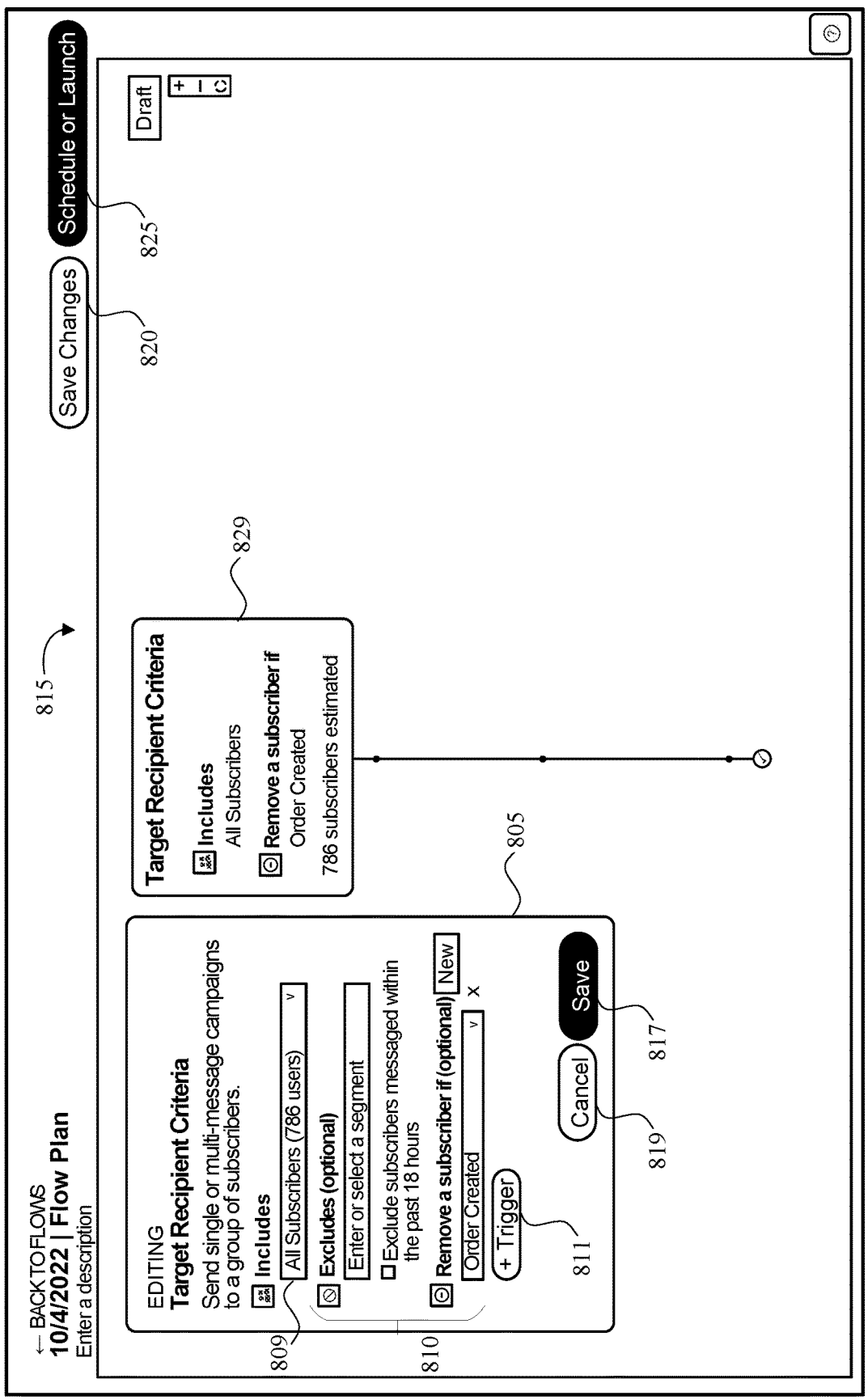
FIG. 8A through FIG. 8F are example illustrations of graphical user interfaces provided by a message management platform for an application operator to compose a flow plan, in accordance with some embodiments.

Referring to FIG. 8A, the GUI may display target recipient criteria 805 that allows the application operator 120 to select the group of end users to which messages may be sent under the message flow plan 600. The target recipient criteria 805 may correspond to a message trigger condition based on which a message may be sent to end users.

The message management platform 110 may receive 720, from an application operator, a selection of message trigger condition 809 as the target recipient criteria 805 for the message flow plan 600. The message management platform 110 may further receive from an application operator 120 a selection of exclusion trigger condition 810 as the target recipient criteria 805 for the message flow plan 600.

In the example shown in FIG. 8A, all end users of the particular application operator 120 are selected as the group of end users for the message flow plan 600 as the message trigger condition 809. The target recipient criteria 805 may further include one or more exclusion trigger conditions 810 based on which one or more end users from the group selected in the target recipient criteria 805 may be excluded temporarily from receiving messages or removed permanently from the group. For example, as shown in FIG. 8A, the exclusion trigger condition 810 may specify that an end user who has created an order is to be removed from the group, thereby preventing sending further (potentially irrelevant) messages to the end user. Additional exclusion triggers 811 may be included in and as the exclusion trigger condition 810. The GUI may also include additional control elements like options to save 817 or cancel 819 changes made to the target recipient criteria 805 for the message flow plan 600, and options to save changes 820 or schedule or launch 825 the message flow plan 600 to start sending messages to end users based on the message flow plan 600.

The message management platform 110 may cause 730 the GUI to display outline 815 for the message flow plan 600 including the target recipient criteria 805 based on the selection received at block 720. That is, as shown in FIG. 8A, based on the input from the application operator 120 to set the target recipient criteria 805 (e.g., pressing the "Save" 817 button), the platform displays the outline 815 of the message flow plan 600 being configured by the publisher. The outline 815 may present the sequential steps being configured under the message flow plan 600 as a flow, so that the user can easily discern the actions being taken under the message flow plan and enable the user to easily change the message flow plan by simply dragging and dropping new instances of actions onto the outline 815, rearranging the steps of the outline 815, or editing a particular step of the outline 815 using a corresponding action composer.

Figure 8B:
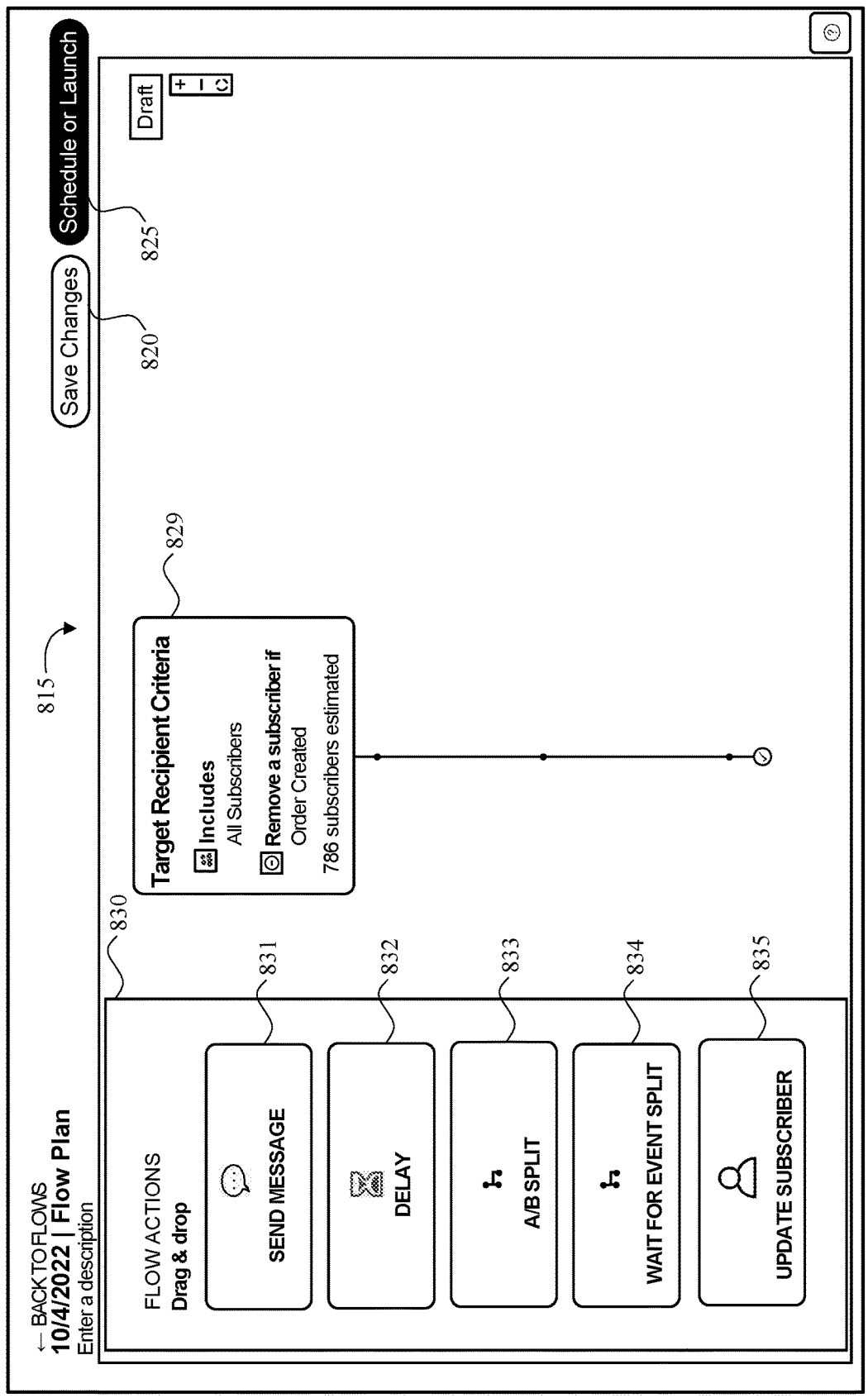

To add steps or actions to the message flow plan 600, the message management platform 110 may cause 740 the GUI to display a flow composer 830 for the application operator 120 to configure steps for the message flow plan. Referring now to FIG. 8B, after the target recipient criteria 805 (including the message trigger condition 809 and any exclusion trigger conditions 810) has been saved 817, the GUI may update the outline 815 to display the saved target recipient criteria 829 in the outline 815, and further display the flow composer 830 that includes different types of actions that can be dragged and dropped into the message flow plan 600.

In the example shown in FIG. 8B, the available flow actions 830 may include an action or step to send a message 831, an action or step to introduce a delay 832 into the message flow plan 600, an action or step to add an A/B split 833, an action or step to wait for an event split 834, and an action or step to update end user 835. Actions 830 shown in FIG. 8B are illustrative only and not intended to be limiting. Additional types of actions 830 may be designed and provided by the flow designer to provide additional functionality to the application operator. The application operator 120 may easily drag and drop the actions 830 into the outline 815 and configure the added actions using a corresponding action composer to build the message flow plan 600.

Figure 8C:
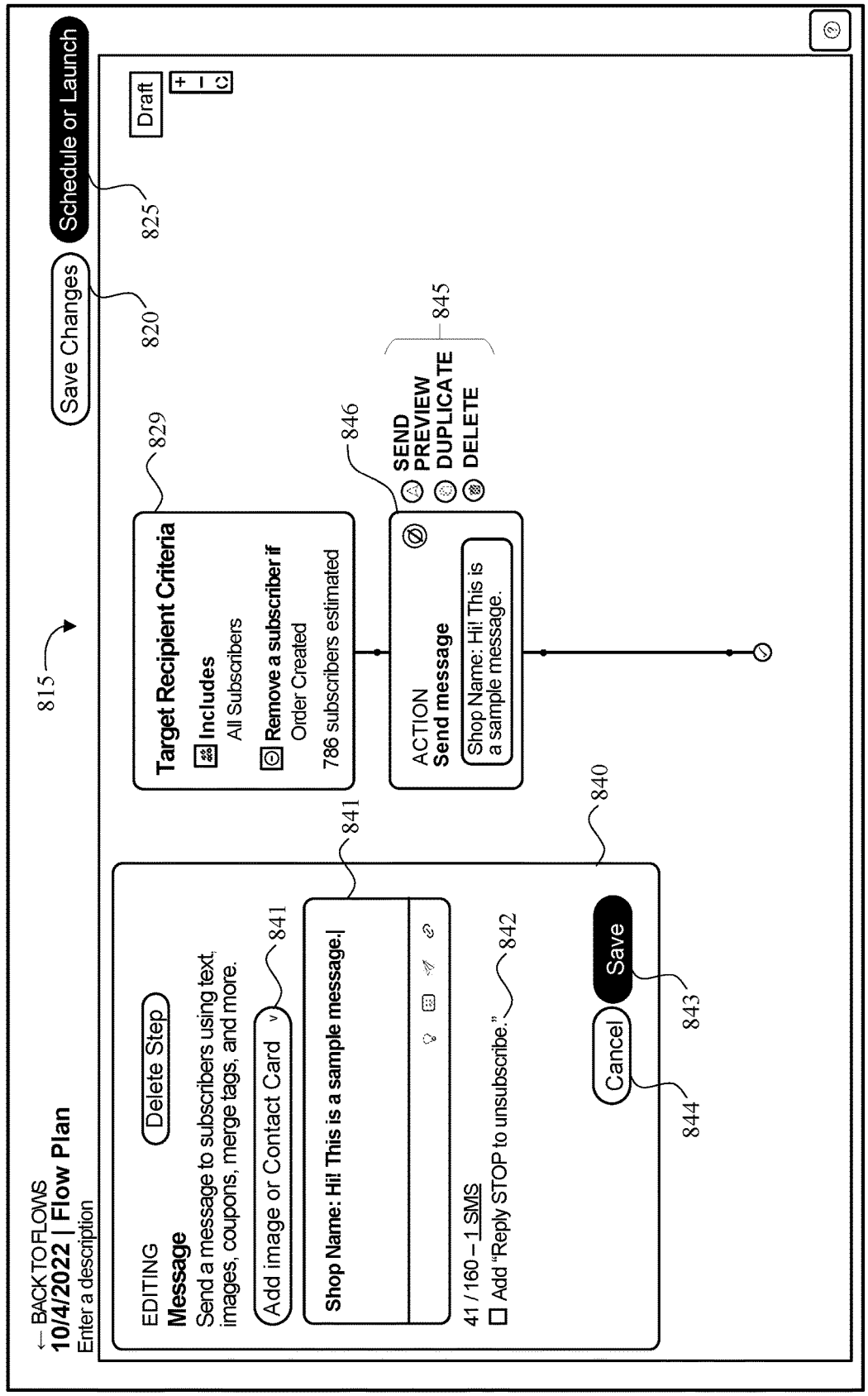

For example, the application operator 120 may add the send message 831 action into the outline 815, and in response, as shown in FIG. 8C, the GUI may display the message composer 840 to configure the message to be sent to the end users. Message composer 840 may include one or more control elements 841 to enable the application operator 120 to design the message payload that is to be transmitted to the group of end users based on the message trigger conditions. The message composer 840 may further include an option 842 to enable the application operator 120 to configure opt-out settings for the message to be received by the end user, and options to save 843 or cancel 844 changes made to the message draft via the message composer 840. The message management platform 110 may cause the GUI to display a message preview 8446 of the message composed using the message composer 840 in the outline 815 to visually represent the ordered sequence of steps 610 of the message flow plan 600. The message management platform 110 may further cause the GUI to display control elements 845 for the message composed using the message composer 840 in the outline 815 to enable the application operator 120 to send a preview 846 of the message to an end user computing device 140 (e.g., smartphone), duplicate the message with the configuration settings for the draft message on the outline as a next step, or delete the draft message from the message flow plan 600.

The message management platform 110 may further cause 750 the GUI to display a wait for event split composer for the application operator 120 to split end users into different branches based on details of an event trigger. The application operator 120 may drag and drop into the outline 815, the wait for event split action 834 from among the flow actions 830 shown in FIG. 8B. In response, as shown by way of example in FIG. 8D, the message management platform 110 may cause the GUI to display the wait for event composer 850 to select an event trigger condition 851 and further select event details 852 based on which the group of end users 829 of the message flow plan 600 are split into two or more branches.

The event trigger condition 851 may be selected from one or more event trigger candidates that are being tracked by the application builder platform 130 of the application operator 120 so that when a specific instance of a tracked event set as the event trigger condition 851 occurs, the message management platform 110 is notified of the instance of the event and the details (e.g., payload in key-value pairs) associated with the instance are transmitted by the application builder platform 130 to the message management platform 110 as event payload data. The one or more event trigger candidates may also include events that are being tracked directly by the message management platform 110 by embedding SDKs associated with events onto webpages hosted on the application builder platform 130 for the application operator.

A GUI may include one or more of the following event trigger candidates that can be selected as the event trigger condition 851. For example, the event trigger candidate may be a checkout started event, a customer created event, a fulfillment created event, an order created event, an order delivered event, an order fulfilled event, an order in-transit event, a product added to cart event, an end user viewed product event, a cart abandoned event, and the like. The checkout started event may be triggered when an end user on an application operator 120 storefront clicks on the checkout link after adding one or more products to a shopping cart. The customer-created event may be triggered when an order is received from a new customer. The order-created event may be triggered when a customer places an order. The product added to the cart event may be triggered when a customer adds a product to a shopping cart. The cart abandoned event may be triggered when a customer does not proceed to checkout after elapse of a predetermined period of time since adding a product to a shopping cart, or when a customer performs a predetermined action (e.g., navigating away from an online storefront) after The cart abandoned event may be triggered when a customer does not proceed to checkout after starting the checkout process but does not completing process after elapse of a predetermined period of time.

For each event trigger candidate selected as the event trigger condition 851, the message management platform 110 may receive from the application builder platform 130 of the application operator 120 an event payload including details of the instance of the triggered event. For example, for the order-created event instance, the event payload may include data (e.g., key-value pair data) customer data, product data, promotion data, activity data, and the like. More specifically, the payload may include shipping address, billing address, country code, state and province code, currency, locale, discount codes, landing site, product information, variant ID, customer ID, product ID, and the like. To split the end users into different branches, the application operator 120 may specify the event details 852 for each branch for a selected event trigger condition 851 and utilize control elements to save 854 or cancel 853 the changes made in the wait for event composer 850 of the message flow plan 600.

Figure 8D:
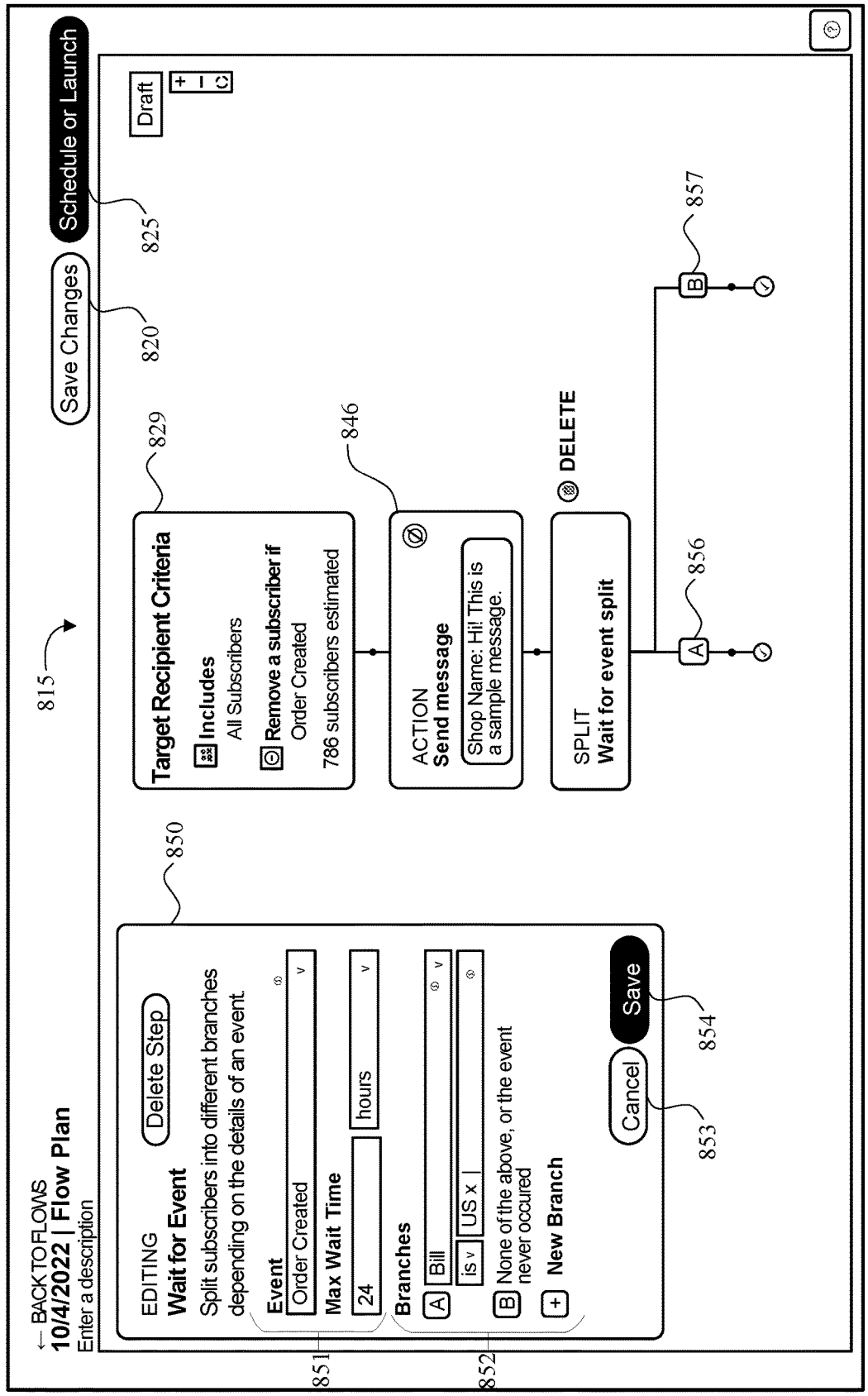
Figure 8E:
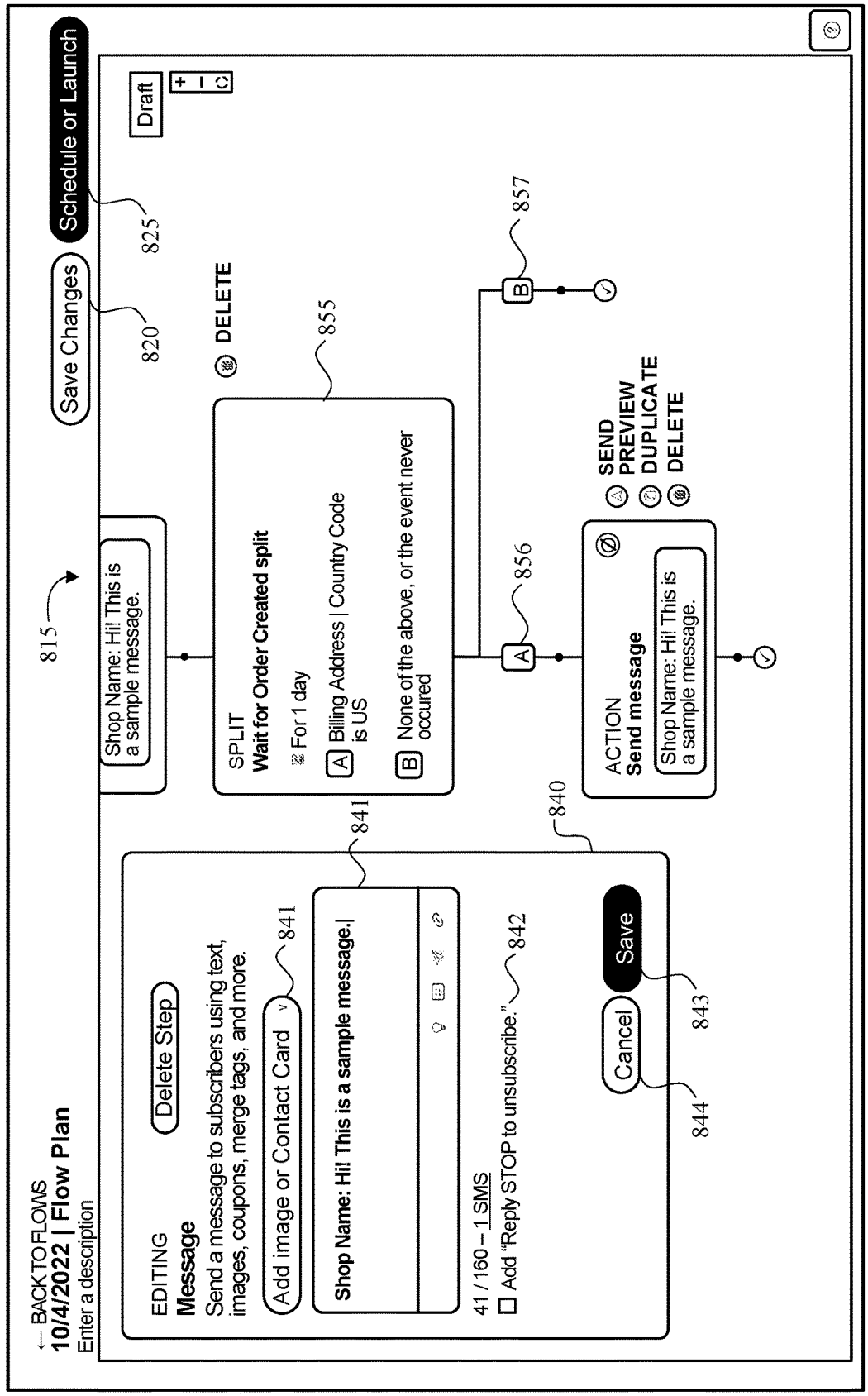

In the example shown in FIG. 8D, the application operator 120 has selected the Order Created event as the event trigger condition 851 and set two branches based on the billing address country code (event details 852) associated with the trigger condition 851. As shown in FIG. 8E, the message management platform 110 may cause the GUI to display a wait for event split preview 855 composed using the wait for split event composer 850 in the outline 815 to visually represent the sequence of steps of the message flow plan 600 and represent the event trigger condition 851 and event details 852 based on which the flow is to be branched into two different message series. In the example shown in FIGS. 8D and 8E, the application operator 120 has set the wait for event split such that when a new order is created and the billing address country code for the new order is the U.S., the message management platform 110 performs steps under split A 856 of the message flow plan 600, and if the billing address country code for the new order is not the U.S., the message management platform 110 performs steps under split B 857 of the message flow plan 600. Although FIGS. 8D and 8E illustrate an example where the split is between two branches, additional branches may be added based on any data point included in the event payload received from the application builder platform 130 in connection with the triggered event of the set event trigger condition 851.

Figure 8F:
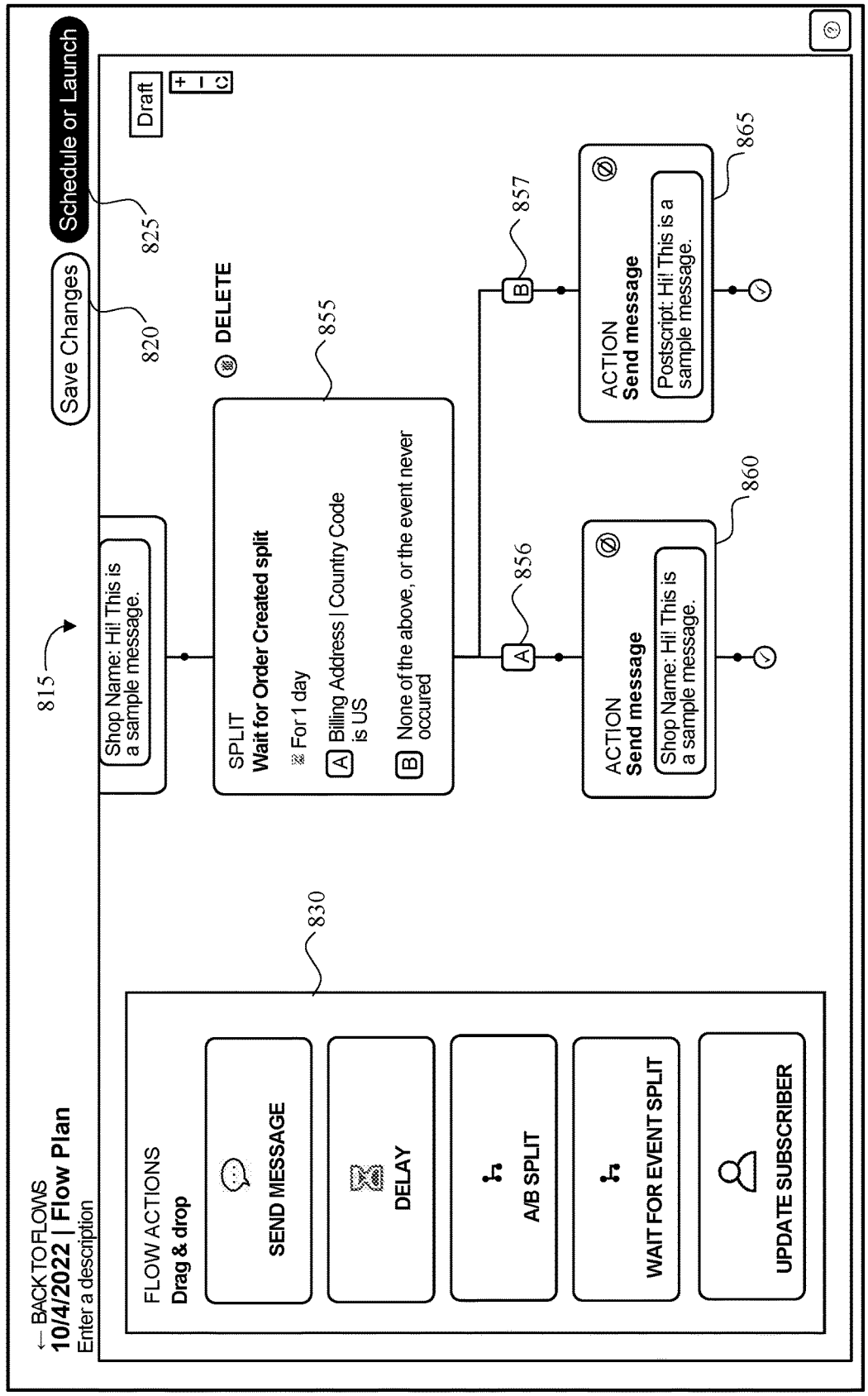

Further, as shown in FIGS. 8E, the application operator 120 may add the send message 831 action into the outline 815 under split A 856 by using the message composer 840 to configure a message to be sent to the end users who meet the trigger condition associated with the wait for event split preview 855 for Split A. Similarly, as shown in FIGS. 8F, the application operator 120 may add the send message 831 action into the outline 815 under split B 857 by using the message composer 840 to configure a message to be sent to the end users who do not meet the trigger condition associated with the wait for event split preview 855 for Split A. Previews of the message drafts to be sent under the respective message series corresponding to Split A and B are shown as message preview 860 and 865 respectively in FIG. 8F. The message management platform 110 is thus configured to, for example, send different messages to end users who have placed orders with an online storefront associated with the application operator 120 to based on the end user's billing address country code.

The message management platform 110 may receive 760 a command from the application operator 120 to launch 825 the composed message flow plan. That is, after completing configuring the message flow plan 600 by using the flow designer GUI as illustrated in FIGS. 8A-3F, the application operator 120 may save changes 820 or may go ahead and schedule or launch 825 the message flow plan 600 to cause the message management platform 110 to start executing the steps 610 associated with the message flow plan and implement respective message series to different end users included in the group of end users for the message flow plan 600 based on the end users meeting different trigger conditions associated with the different message series.

At block 770, the message management platform 110 or the application builder platform 130 associated with the application operator 120 may detect the occurrence of a message trigger condition for an end user included in the group of end users for the message flow plan. For example, after the message flow plan 600 is launched, the application builder platform 130 may track the activities of visitors to one or more pages of an online storefront associated with the application operator 120 and upon the detection of an event trigger condition 851, generate the event details of the instance of the triggered event as an event payload and transmit the event payload to the message management platform 110. As another example, the message management platform 110 may embed an SDK on the application builder platform 130 to track the activities of visitors to one or more pages of the online storefront associated with the application operator 120 and upon the detection of the event trigger condition 851, generate the event details of the instance of the triggered event as the event payload.

The message management platform 110 may utilize the data in the event payload to determine whether the data corresponds to an end user included in the group of end users to the message flow plan launched at block 760 and determines the message series to implement under the message flow plan 600 based on the determination. The operations performed at block 770 are described in connection with the webpage shown in FIG. 9.

FIG. 9 represents an e-commerce webstore page 900 of an application operator's storefront that may be hosted on the application builder platform 130. As explained previously, the application builder platform 130 may detect trigger events that are being monitored by the message management platform 110 in one or more launched flow plans and transmits the event payload when an instance of the trigger event is detected. Alternately, the SDK of the message management platform 110 may be embedded in the hosted instance of the webpage shown in FIG. 9, which allows the message management platform 110 to track user activity on the webpage and generate the payload data based on the tracking for predetermined trigger events associated with flow plans. In the example GUI of FIG. 9, the application operator 120 may have launched a flow plan that sends a predetermined series of messages to an end user when the end user adds a product to a cart by clicking on the button Add to Cart 905 (e.g., the message trigger condition is adding a product to cart).

Based on the action detected on the webpage 900, the message management platform 110 or the application builder platform 130 where the webpage 900 is hosted may generate event payload data associated with the instance of the add product to cart event. In the example of FIG. 9, the payload data may include product information (e.g., shoe size, shoe color, shoe quantity), buyer information (e.g., email, phone number, billing address, shipping address), promotion information (e.g., coupons), and the like. Based on the buyer information (e.g., email, phone number, address) included in the payload, the message management platform 110 may be configured to determine whether the customer whose activity on webpage 900 has triggered the add to cart event is a registered user of the application operator 120 (e.g., the user has previously opted-in to receive communications over SMS from the application operator). In response to determining that the user is a registered end user, the message management platform 110 may further determine whether the end user is part of the group of end users corresponding to the message flow plan 600 associated with the message trigger condition based on the target recipient criteria 805 of the message flow plan 600. In response to the message management platform 110 determining that the end user is part of the group of end users corresponding to the message flow plan 600, the message management platform 110 may implement a message series per the message flow plan 600 for the end user. That is, at block 780 in FIG. 7, the message management platform 110 may create an instance of a message of the message flow plan 600 with respect to the end user associated with the message trigger condition.

In order to determine the product information associated with the add to cart event, the message management platform 110 may utilize the variant ID 910 associated with the webpage 900 to lookup product details like size, quantity, color, and the like. The variant ID 910 may reside in the URL of the webpage 900 or in the HTML code (not shown in figures) of the webpage 900. The identified product information may then be used by the message management platform 110 to determine which of multiple message series to implement for the end user, in case a message series in the message flow plan 600 is determined based on specifics of the product added to cart by the end user (e.g., send a first message to an end user adding a black color version of a product to a cart, and send a second different message to an end user adding a blue color version of the product to the cart). At block 790, the message management platform 110 may transmit the message to the end user based on the rules and the logic of the message flow plan 600.

Computing Machine Architecture

Figure 10:
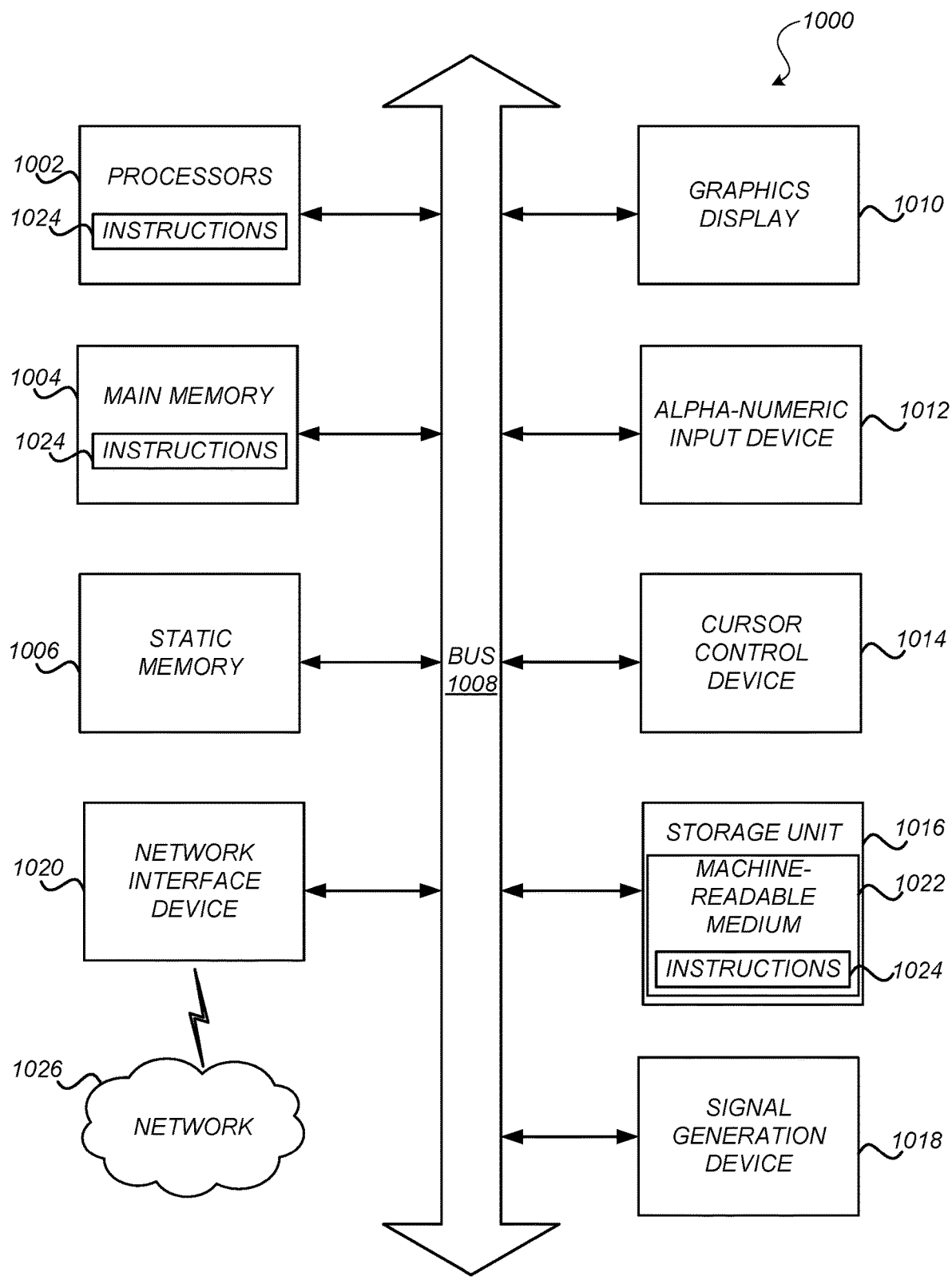
FIG. 10 is a block diagram illustrating components of an example computing machine, in accordance with some embodiments.

FIG. 10 is a block diagram illustrating components of an example computing machine that is capable of reading instructions from a computer-readable medium and execute them in a processor (or controller). A computer described herein may include a single computing machine shown in FIG. 10, a virtual machine, a distributed computing system that includes multiples nodes of computing machines shown in FIG. 10, or any other suitable arrangement of computing devices.

By way of example, FIG. 10 shows a diagrammatic representation of a computing machine in the example form of a computer system 1000 within which instructions 1024 (e.g., software, source code, program code, bytecode, or machine code), which may be stored in a computer-readable medium for causing the machine to perform any one or more of the processes discussed herein may be executed. In some embodiments, the computing machine operates as a stand-alone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 10 may correspond to any software, hardware, or combined components shown in FIGS. 1, 2A and 3, including but not limited to, the message management platform 110, the application builder platform 130, the user computing device 140 and various engines, interfaces, terminals, and machines shown in FIG. 3. While FIG. 10 shows various hardware and software elements, each of the components described in FIG. 1, FIG. 2A, and FIG. 3 may include additional or fewer elements. Further, the instructions may correspond to the functionality of components and interfaces described with FIGS. 1-9.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1024 that specify actions to be taken by that machine. Further, while only a single machine is illustrated, the term "machine" and "computer" may also be taken to include any collection of machines that individually or jointly execute instructions 1024 to perform any one or more of the methodologies discussed herein.

The example computer system 1000 includes one or more processors 1002 such as a CPU (central processing unit), a GPU (graphics processing unit), a TPU (tensor processing unit), a DSP (digital signal processor), a system on a chip (SOC), a controller, a state machine, an application-specific integrated circuit (ASIC), a field-programmable gate array (FPGA), or any combination of these. Parts of the computing system 1000 may also include a memory 1004 that store computer code including instructions 1024 that may cause the processors 1002 to perform certain actions when the instructions are executed, directly or indirectly by the processors 1002. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 1002 and reduces the space required for the memory 1004. For example, the methods described herein reduce the complexity of the computation of the processors 1002 by applying one or more novel techniques that simplify the steps in training, reaching convergence, and generating results of the processors 1002. The algorithms described herein also reduces the size of the models and datasets to reduce the storage space requirement for memory 1004.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 1000 may include a main memory 1004, and a static memory 1006, which are configured to communicate with each other via a bus 1008. The computer system 1000 may further include a graphics display unit 1010 (e.g., a plasma display panel (PDP), a liquid crystal display (LCD), a projector, or a cathode ray tube (CRT)). The graphics display unit 1010, controlled by the processors 1002, displays a GUI (GUI) to display one or more results and data generated by the processes described herein. The computer system 1000 may also include an alphanumeric input device 1012 (e.g., a keyboard), a cursor control device 1014 (e.g., a mouse, a trackball, a joystick, a motion sensor, or another pointing instrument), a storage unit 1016 (a hard drive, a solid state drive, a hybrid drive, a memory disk, etc.), a signal generation device 1018 (e.g., a speaker), and a network interface device 1020, which also are configured to communicate via the bus 1008.

The storage unit 1016 includes a computer-readable medium 1022 on which is stored instructions 1024 embodying any one or more of the methodologies or functions described herein. The instructions 1024 may also reside, completely or at least partially, within the main memory 1004 or within the processor 1002 (e.g., within a processor's cache memory) during execution thereof by the computer system 1000, the main memory 1004 and the processor 1002 also constituting computer-readable media. The instructions 1024 may be transmitted or received over a network 1026 via the network interface device 1020.

While computer-readable medium 1022 is shown in an example embodiment to be a single medium, the term "computer-readable medium" should be taken to include a single medium or multiple media (e.g., a centralized or distributed database, or associated caches and servers) able to store instructions (e.g., instructions 1024). The computer-readable medium may include any medium that is capable of storing instructions (e.g., instructions 1024) for execution by the processors (e.g., processors 1002) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

ADDITIONAL CONSIDERATIONS

Beneficially, various embodiments described herein provide integration to application building ecosystem that allows application operators to effectively communicate with the end users of the applications while allowing the application operators to enhance the functionalities of their applications by incorporating various third-party read-to-use features. Various disclosed embodiments allow a message management platform to effectively communicate with any third-party platforms that provide features to the applications and distribute messages based on triggers that occur at the third-party platforms. This streamlines the application building process and enhance communication capability for application operators.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments according to the invention are in particular disclosed in the attached claims directed to a method and a computer program product, wherein any feature mentioned in one claim category, e.g., method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The invention claimed is:

1. A system, comprising:
software code instructions executable by a computing device to:
provide a user interface;
receive, via the user interface, a message-flow plan of a merchant, wherein the message-flow plan specifies a message flow that is a campaign to be distributed to multiple users, wherein the message-flow plan includes a scheduled start of the campaign, wherein the message-flow plan specifies criteria defining a target segment, and wherein at least one message of the message-flow plan is associated with a trigger condition different than the criteria; and
transmit the message-flow plan; and
a message management platform comprising one or more processors and memory, the memory configured to store code instructions executable by the one or more processors to:
receive the message-flow plan;
subscribe to receive application programming interface (API) notifications from an application builder platform that provides server-side services for an e-commerce application of the merchant, wherein the e-commerce application executes client-side on user devices, and wherein the API notifications include information describing events related to the server-side services;
receive an API notification from the application builder platform, the API notification including a user ID of a user and information describing a first event that is attributable to the user ID, wherein the first event is a completed transaction event associated with an order placed by the user on the e-commerce application;
determine, based on the first event and at the scheduled start of the campaign, that the user qualifies under the criteria to be included in the target segment and enroll the user in the campaign;
receive either another API notification from the application builder platform that includes the user ID, or a code-snippet notification from an instance of the e-commerce application executing on a device of the user, wherein the code-snippet notification includes information that specifies a device ID of the device, which device ID is different from the user ID, and wherein the code-snippet notification further includes information describing a second event that is attributable to the device ID, the device ID being correlated to the user ID; and
determine, based on an event associated with said another API notification from the application builder platform or based on the second event, that the trigger condition is met and, in response, transmit the at least one message associated with the trigger condition to the enrolled user.

2. The system of claim 1, wherein the memory is further configured to store code instructions executable by the one or more processors to:
receive, for the user enrolled in the campaign, a notification including information describing a new event attributable to the user;
determine that the new event meets an exclusion condition; and
responsive to determining that the new event meets the exclusion condition, remove the user from a group of users enrolled in the campaign.

3. The system of claim 2, wherein the new event is one of a completed transaction event and a user opt-out event.

4. The system of claim 1, wherein the criteria defining the target segment is further based on tags specifying user characteristics.

5. The system of claim 1, wherein the memory is further configured to store code instructions executable by the one or more processors to:
transmit, to each user enrolled in the campaign and at the scheduled start of the campaign, an initial message to the user per the message-flow plan prior to transmitting the at least one message associated with the trigger condition.

6. The system of claim 1, wherein the memory is further configured to store code instructions executable by the one or more processors to:
receive another code-snippet notification from the instance of the e-commerce application executing on the device of the user, the another code-snippet notification including information describing a third event that is attributable to the device ID;
wherein the instructions to determine that the user qualifies under the criteria to be included in the target segment and enroll the user in the campaign further comprises instructions to qualify at the scheduled start of the campaign based on the first event and the third event.

7. The system of claim 1, wherein each code-snippet notification is generated by a code snippet of the message management platform, the code snippet being listed in a digital distribution platform of the application builder platform.

8. The system of claim 1, wherein the API notifications received from the application builder platform are webhook notifications.

9. The system of claim 1, wherein the memory is further configured to store code instructions executable by the one or more processors to:
introduce a delay of a predetermined amount of time as dictated by the message-flow plan prior to execution of the instruction to determine that the trigger condition is met.

10. The system of claim 1, wherein the second event is a browsing event.

11. A system, comprising:
software code instructions executable by a computing device to:
provide for display a user interface;
receive, via the user interface, a message-flow plan of a merchant, wherein the message-flow plan specifies a message flow that is a campaign to be distributed to multiple users, wherein the message-flow plan includes a scheduled start of the campaign, wherein the message-flow plan specifies criteria defining a target segment, and wherein at least one message of the message-flow plan is associated with a trigger condition different than the criteria; and
transmit the message-flow plan; and
a message management platform comprising one or more processors and memory, the memory configured to store code instructions executable by the one or more processors to:
receive the message-flow plan;
subscribe to receive application programming interface (API) notifications from an application builder platform that provides server-side services for an e-commerce application of the merchant, wherein the e-commerce application executes client-side on user devices, and wherein the API notifications include information describing events related to the server-side services;
receive a code-snippet notification from an instance of the e-commerce application executing on a device of a user, wherein the code-snippet notification includes information that specifies a device ID of the device, wherein the code-snippet notification further includes information describing a first event that is attributable to the device ID;
determine, based on the first event and at the scheduled start of the campaign, that the user qualifies under the criteria to be included in the target segment and enroll the user in the campaign;
receive either another code-snippet notification that includes information that specifies the device ID, or an API notification from the application builder platform, the API notification from the application builder platform including a user ID of the user and information describing a second event that is attributable to the user ID, the user ID being correlated to the device ID, wherein the second event is a completed transaction event associated with an order placed by the user on the e-commerce application; and
determine, based on an event associated with said another code-snippet notification or based on the second event, that the trigger condition is met and, in response, transmit the at least one message associated with the trigger condition to the enrolled user.

12. The system of claim 11, wherein the memory is further configured to store code instructions executable by the one or more processors to:
receive, for the user enrolled in the campaign, a notification including information describing a new event attributable to the user;
determine that the new event meets an exclusion condition; and
responsive to determining that the new event meets the exclusion condition, remove the user from a group of users enrolled in the campaign.

13. The system of claim 12, wherein the new event is one of a completed transaction event and a user opt-out event.

14. The system of claim 11, wherein the criteria defining the target segment is further based on tags specifying user characteristics.

15. The system of claim 11, wherein the memory is further configured to store code instructions executable by the one or more processors to:
transmit, to each user enrolled in the campaign and at the scheduled start of the campaign, an initial message to the user per the message-flow plan prior to transmitting the at least one message associated with the trigger condition.

16. The system of claim 11, wherein the memory is further configured to store code instructions executable by the one or more processors to:
receive another API notification from the application builder platform, wherein said another API notification includes the user ID of the user and information describing a third event that is attributable to the user ID, wherein the third event is a completed transaction event associated with an order placed by the user on the e-commerce application;
wherein the determination that the user qualifies under the criteria at the scheduled start of the campaign to be included in the target segment and enroll the user in the campaign is responsive to the correlation and is further based on the first event and the third event.

17. The system of claim 11, wherein each code-snippet notification is generated by a code snippet of the message management platform, the code snippet being listed in a digital distribution platform of the application builder platform.

18. The system of claim 11, wherein the API notifications received from the application builder platform are webhook notifications.

19. The system of claim 11, wherein the memory is further configured to store code instructions executable by the one or more processors to:
introduce a delay of a predetermined amount of time as dictated by the message-flow plan prior to determining execution of the instructions to determine that the trigger condition is met.

20. The system of claim 11, wherein the first event is a browsing event.

21. A computer-implemented method, comprising:
receiving, via a user interface, a message-flow plan of a merchant, wherein the message-flow plan specifies a message flow that is a campaign to be distributed to multiple users, wherein the message-flow plan includes a scheduled start of the campaign, wherein the message-flow plan specifies criteria defining a target segment, and wherein at least one message of the message-flow plan is associated with a trigger condition different than the criteria;
subscribing to receive application programming interface (API) notifications from an application builder platform that provides server-side services for an e-commerce application of the merchant, wherein the e-commerce application executes client-side on user devices, and wherein the API notifications include information describing events related to the server-side services;
receiving API notifications from the application builder platform, a first API notification including a first user ID of a first user and information describing a first event that is attributable to the first user ID, a second API notification including a second user ID of a second user and information describing a second event that is attributable to the second user ID, wherein each of the first event and the second event is a completed transaction event associated with an order placed by the first user or the second user on the e-commerce application;
determining, based on the first and second events and at the scheduled start of the campaign, that the first and second users qualify under the criteria to be included in the target segment and enroll the first and second users in the campaign;
receiving either (i) another API notification from the application builder platform that includes the first user ID, wherein said another API notification includes information describing a third event that is attributable to the first user ID, or (ii) a code-snippet notification from an instance of the e-commerce application executing on a device of the first user, wherein the code-snippet notification includes information that specifies a device ID of the device, which device ID is different from the first user ID, and wherein the code-snippet notification further includes information describing a fourth event that is attributable to the device ID, the device ID being correlated to the first user ID; and
determining, based on either the third or fourth events, depending on which one was received, that the trigger condition is met and, in response, transmit the at least one message associated with the trigger condition to the enrolled first user.

22. The computer-implemented method of claim 21, further comprising:
receiving, for the first user enrolled in the campaign, a notification including information describing a new event attributable to the first user;
determining that the new event meets an exclusion condition; and
responsive to determining that the new event meets the exclusion condition, removing the first user from a group of users enrolled in the campaign.

23. The computer-implemented method of claim 22, wherein the new event is one of a completed transaction event and a user opt-out event.

24. The computer-implemented method of claim 21, wherein the criteria defining the target segment is further based on tags specifying user characteristics.

25. The computer-implemented method of claim 21, further comprising:
transmitting, to each of the first and second users enrolled in the campaign and at the scheduled start of the campaign, an initial message to the user per the message-flow plan prior to transmitting the at least one message associated with the trigger condition.

26. A non-transitory computer-readable medium storing code instructions that, when executed by one or more processors, cause the one or more processors to perform operations comprising:
receiving, via a user interface, a message-flow plan of a merchant, wherein the message-flow plan specifies a message flow that is a campaign to be distributed to multiple users, wherein the message-flow plan includes a scheduled start of the campaign, wherein the message-flow plan specifies criteria defining a target segment, and wherein at least one message of the message-flow plan is associated with a trigger condition different than the criteria;
subscribing to receive application programming interface (API) notifications from an application builder platform that provides server-side services for an e-commerce application of the merchant, wherein the e-commerce application executes client-side on user devices, and wherein the API notifications include information describing events related to the server-side services;
receiving API notifications from the application builder platform, a first API notification including a first user ID of a first user and information describing a first event that is attributable to the first user ID, a second API notification including a second user ID of a second user and information describing a second event that is attributable to the second user ID, wherein each of the first event and the second event is a completed transaction event associated with an order placed by the first user or the second user on the e-commerce application;
determining, based on the first and second events and at the scheduled start of the campaign, that the first and second users qualify under the criteria to be included in the target segment and enroll the first and second users in the campaign;
receiving either (i) another API notification from the application builder platform that includes the first user ID, wherein said another API notification includes information describing a third event that is attributable to the first user ID, or (ii) a code-snippet notification from an instance of the e-commerce application executing on a device of the first user, wherein the code-snippet notification includes information that specifies a device ID of the device, which device ID is different from the first user ID, and wherein the code-snippet notification further includes information describing a fourth event that is attributable to the device ID, the device ID being correlated to the first user ID; and determining, based on either the third or fourth events, depending on which one was received, that the trigger condition is met and, in response, transmit the at least one message associated with the trigger condition to the enrolled first user.

27. The non-transitory computer-readable medium of claim 26, wherein the code instructions further cause the one or more processors to perform operations comprising:

receiving, for the first user enrolled in the campaign, a notification including information describing a new event attributable to the first user;

determining that the new event meets an exclusion condition; and responsive to determining that the new event meets the exclusion condition, removing the first user from a group of users enrolled in the campaign.

28. The non-transitory computer-readable medium of claim 27, wherein the new event is one of a completed transaction event and a user opt-out event.

29. The non-transitory computer-readable medium of claim 26, wherein the criteria defining the target segment is further based on tags specifying user characteristics.

30. The non-transitory computer-readable medium of claim 26, wherein the code instructions further cause the one or more processors to perform an operation comprising:

transmitting, to each of the first and second users enrolled in the campaign and at the scheduled start of the campaign, an initial message to the user per the message-flow plan prior to transmitting the at least one message associated with the trigger condition.

* * * * *